US010509147B2

(12) United States Patent
Rossi et al.

(10) Patent No.: US 10,509,147 B2
(45) Date of Patent: Dec. 17, 2019

(54) APPARATUS FOR PRODUCING PATTERNED ILLUMINATION USING ARRAYS OF LIGHT SOURCES AND LENSES

(71) Applicant: AMS SENSORS SINGAPORE PTE. LTD., Singapore (SG)

(72) Inventors: Markus Rossi, Jona (CH); Hans Peter Herzig, Neuchâtel (CH); Philipp Mueller, Freiburg (DE); Ali Naqavi, Neuchâtel (CH); Daniel Infante Gomez, Neuchâtel (CH); Moshe Doron, San Francisco, CA (US); Matthias Gloor, Boswil (CH); Alireza Yasan, San Jose, CA (US); Hartmut Rudmann, Jona (CH); Martin Lukas Balimann, Zürich (CH); Mai-Lan Elodie Boytard, Zürich (CH); Bassam Hallal, Thalwil (CH); Daniel Pérez Calero, Zürich (CH); Julien Boucart, Zürich (CH); Hendrik Volkerink, Santa Clara, CA (US)

(73) Assignee: AMS SENSORS SINGAPORE PTE. LTD, Singapore (SG)

( * ) Notice: Subject to any disclaimer, the term of this patent is extended or adjusted under 35 U.S.C. 154(b) by 176 days.

(21) Appl. No.: 15/546,298

(22) PCT Filed: Jan. 26, 2016

(86) PCT No.: PCT/SG2016/050033
§ 371 (c)(1),
(2) Date: Jul. 26, 2017

(87) PCT Pub. No.: WO2016/122404
PCT Pub. Date: Aug. 4, 2016

(65) Prior Publication Data
US 2018/0267214 A1    Sep. 20, 2018

Related U.S. Application Data

(63) Continuation-in-part of application No. 14/608,408, filed on Jan. 29, 2015, now Pat. No. 9,273,846.
(Continued)

(51) Int. Cl.
G02B 19/00      (2006.01)
G02B 3/00       (2006.01)
(Continued)

(52) U.S. Cl.
CPC ......... G02B 3/0056 (2013.01); G02B 3/0062 (2013.01); G02B 3/04 (2013.01);
(Continued)

(58) Field of Classification Search
CPC .......... F21V 5/004; F21V 5/007; F21V 5/002; G02B 19/0066; G02B 19/0061
See application file for complete search history.

(56) References Cited

U.S. PATENT DOCUMENTS 5,900,981 A    5/1999  Oren et al.
7,970,177 B2   6/2011  St. Hilaire et al.
(Continued)

FOREIGN PATENT DOCUMENTS

CN    101855902 A    10/2010
CN    102129152 A    7/2011
(Continued)

OTHER PUBLICATIONS

European Patent Office, Extended EP search report in European patent application No. 16743802.7 (dated Aug. 28, 2018).
(Continued)

*Primary Examiner* — Robert J May
(74) *Attorney, Agent, or Firm* — Michael Best & Friedrich LLP

(57) ABSTRACT

An apparatus for producing structured light comprises a first optical arrangement which comprises a microlens array (L1)

comprising a multitude of transmissive or reflective microlenses (2) which are regularly arranged at a lens pitch P and an illumination unit for illuminating the microlens array. The illumination unit comprises an array (S1) of light sources (1) for emitting light of a wavelength L each and having an aperture each, wherein the apertures are located in a common emission plane which is located at a distance D from the microlens array. For the lens pitch P, the distance D and the wavelength L, the following equation applies $P^2=2LD/N$, wherein N is an integer with $N \geq 1$. High-contrast high-intensity light patterns can be produced. Devices comprising such apparatuses can be used for depth mapping.

18 Claims, 10 Drawing Sheets

Related U.S. Application Data

(60) Provisional application No. 62/147,299, filed on Apr. 14, 2015.

(51) Int. Cl.
  *G02B 3/04* (2006.01)
  *G02B 5/04* (2006.01)
  *G02B 27/09* (2006.01)
  *G02B 27/48* (2006.01)
  *F21Y 105/16* (2016.01)
  *F21Y 115/30* (2016.01)

(52) U.S. Cl.
  CPC ......... *G02B 5/045* (2013.01); *G02B 19/0066* (2013.01); *G02B 27/0905* (2013.01); *G02B 27/48* (2013.01); *F21Y 2105/16* (2016.08); *F21Y 2115/30* (2016.08); *G02B 2207/123* (2013.01)

(56) References Cited

U.S. PATENT DOCUMENTS

| | | |
|---|---|---|
| 8,009,358 B2 | 8/2011 | Zalevsky et al. |
| 8,320,621 B2 | 11/2012 | McEldowney |
| 8,749,796 B2 | 6/2014 | Pesach et al. |
| 8,908,277 B2 | 12/2014 | Pesach et al. |
| 9,063,283 B2 | 6/2015 | Shpunt et al. |
| 9,273,846 B1 | 3/2016 | Rossi et al. |
| 2010/0118123 A1 | 4/2010 | Freedman et al. |
| 2011/0037953 A1 | 2/2011 | Nizani et al. |
| 2011/0057277 A1 | 3/2011 | Yu |
| 2012/0038986 A1 | 2/2012 | Pesach |
| 2012/0051588 A1 | 3/2012 | McEldowney |
| 2012/0257191 A1 | 10/2012 | Deckenbach et al. |
| 2013/0038941 A1 | 2/2013 | Pesach et al. |
| 2013/0170203 A1 | 7/2013 | Cheng et al. |
| 2013/0201424 A1 | 8/2013 | Uchida et al. |
| 2014/0376092 A1 | 12/2014 | Mor |
| 2015/0036114 A1 | 2/2015 | Schadt et al. |
| 2016/0291200 A1 | 10/2016 | Bakin et al. |
| 2017/0090020 A1 | 3/2017 | Buettgen |
| 2017/0135617 A1 | 5/2017 | Alasirniö et al. |

FOREIGN PATENT DOCUMENTS

| | | |
|---|---|---|
| JP | H11231316 A | 8/1999 |
| JP | 2002-311433 A | 10/2002 |
| WO | 2014/083485 A | 6/2005 |
| WO | 2009/040822 A2 | 4/2009 |
| WO | 2012/058360 A2 | 5/2012 |
| WO | 2011/135755 A | 7/2013 |

OTHER PUBLICATIONS

Australian Patent Office, International Search Report for PCT/SG2016/050033 dated Jun. 3, 2016.
Jahns, J. et al., "The Lau Effect (A diffraction Experiment with Incoherent Illumination)", *Optics Communications*, 28(3):263-267 (1979).
Kolodziejczyk, A., et al., "Lens-based theory of the Lau effect", *J. Opt. Soc. Am. A.*, 17(4):724-728 (2000).
Som, S.C. et al., "The Generalised Lau Effect", *Journal of Modern Optics*, 37(7):1215-1225 (1990).

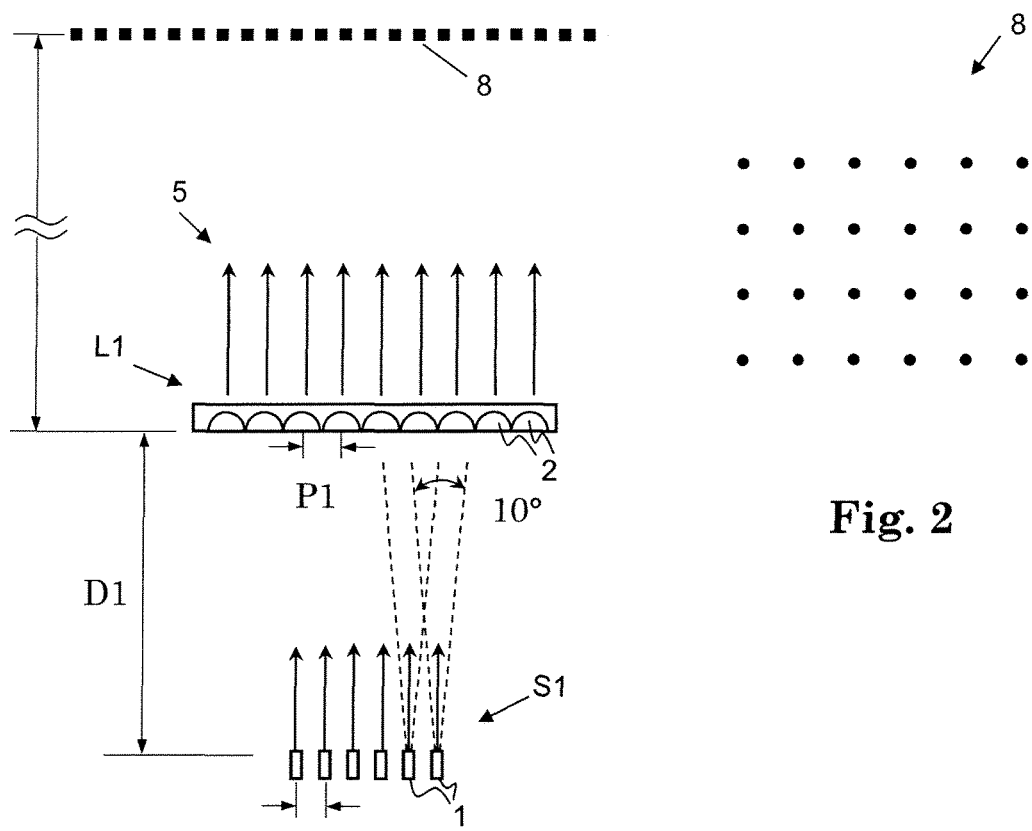
Fig. 2
Fig. 1
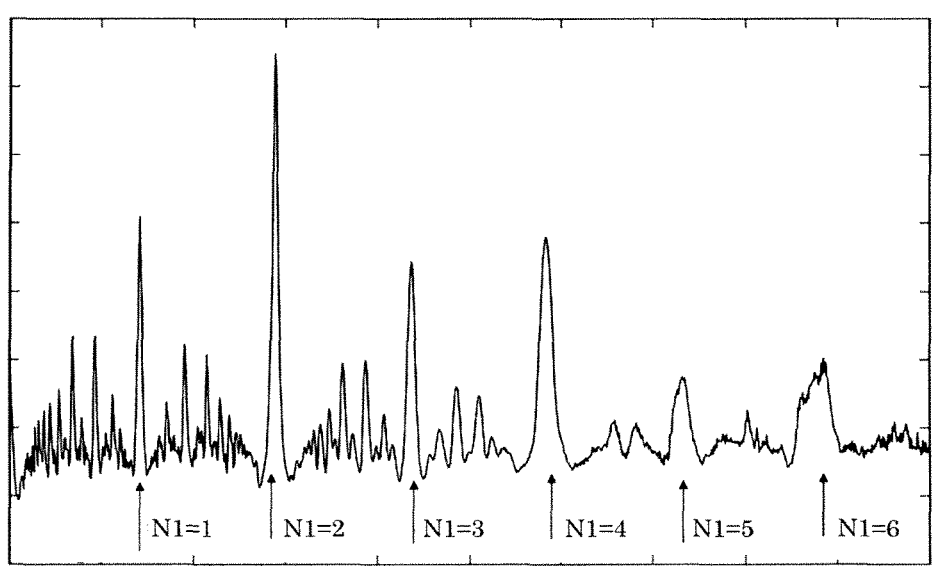
Fig. 3

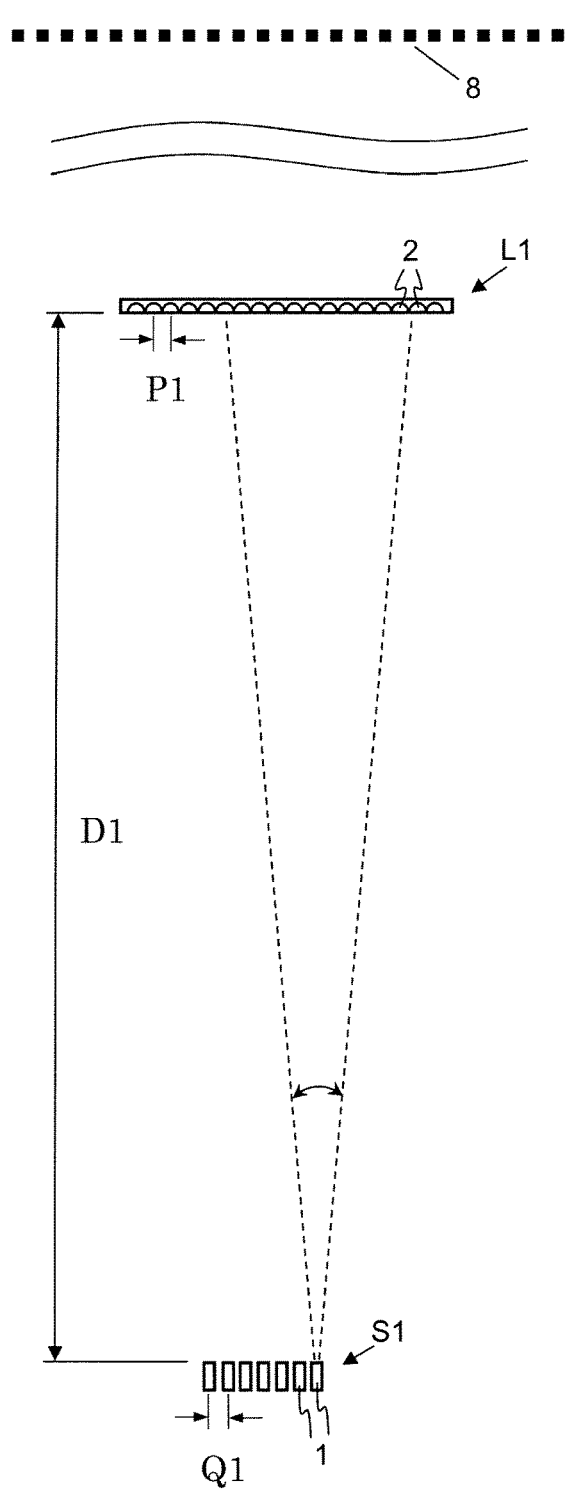
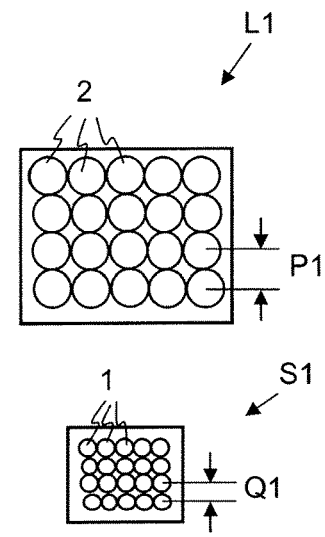
Fig. 5
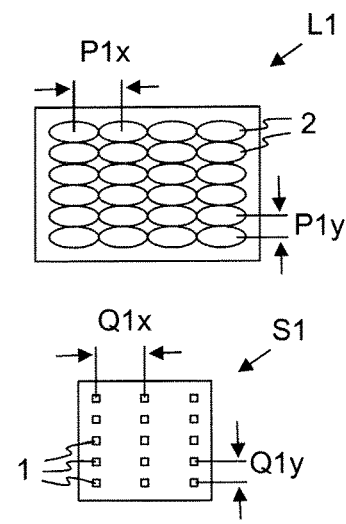
Fig. 6
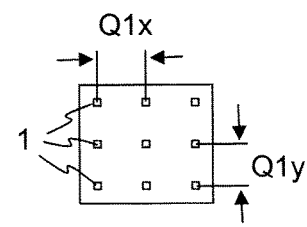
Fig. 4    Fig. 7

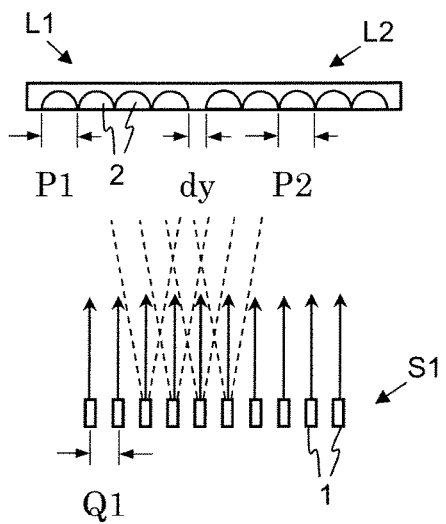
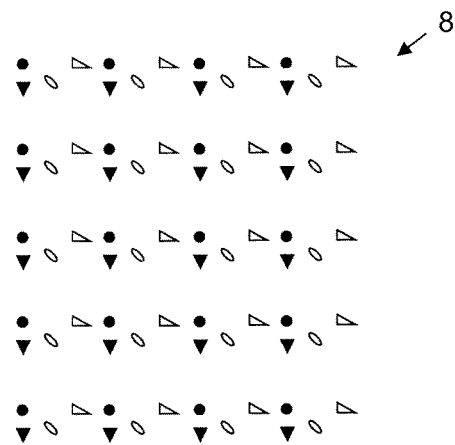
Fig. 10
Fig. 8
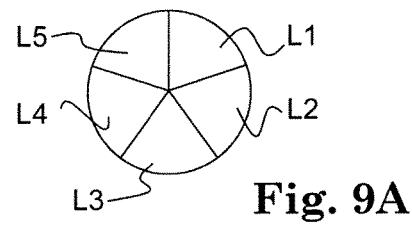
Fig. 9A
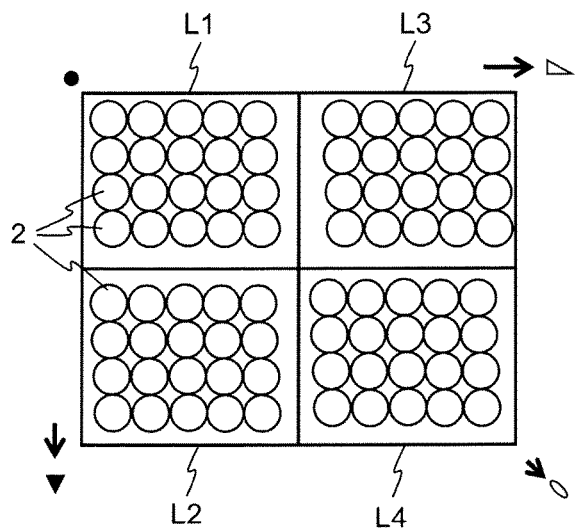
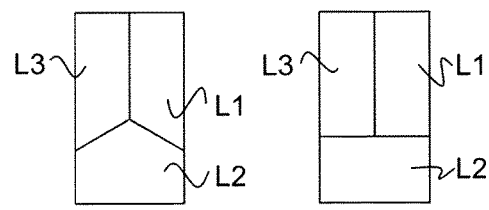
Fig. 9B    Fig. 9C
Fig. 9
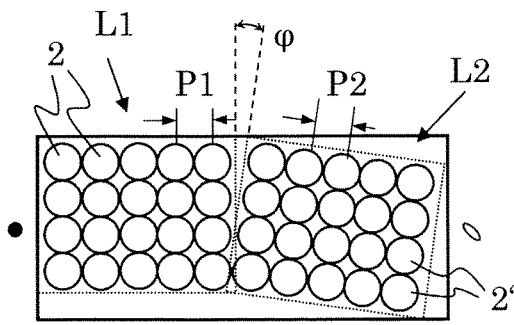
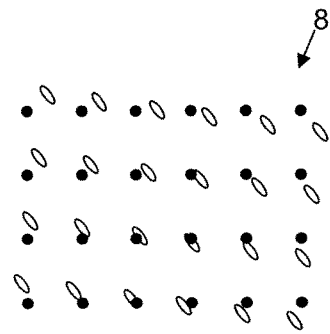
Fig. 11
Fig. 12

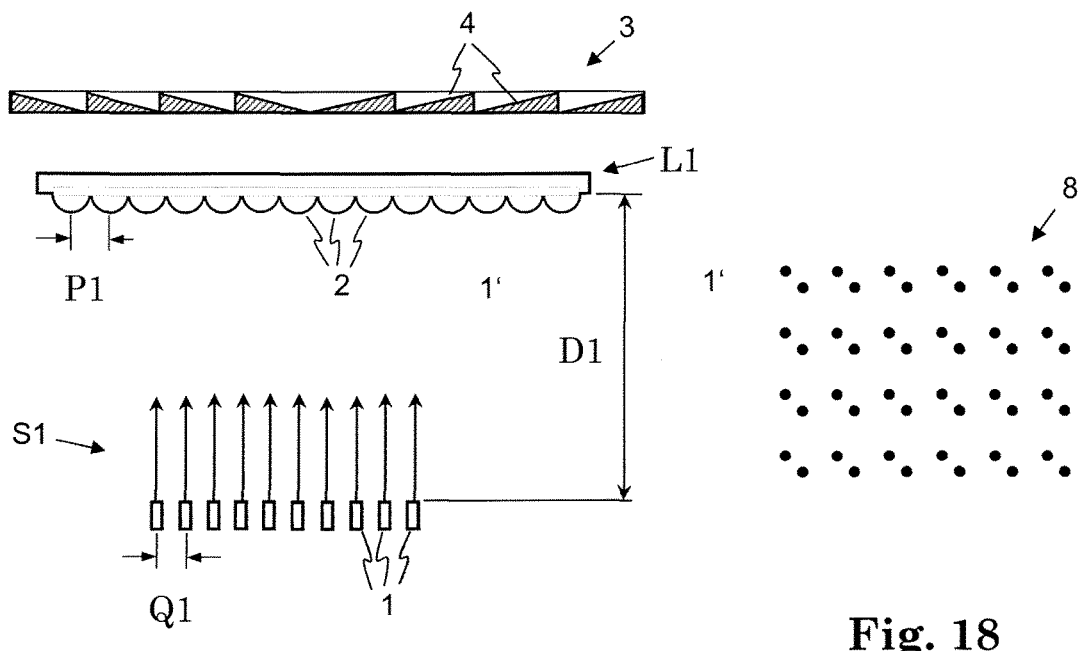
Fig. 17
Fig. 18
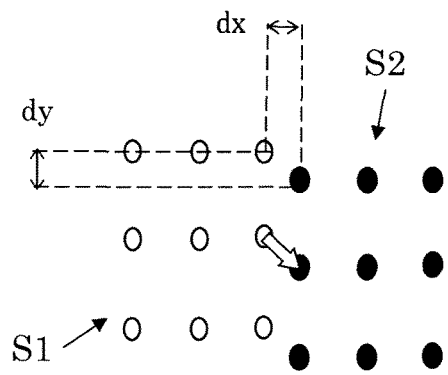
Fig. 19A
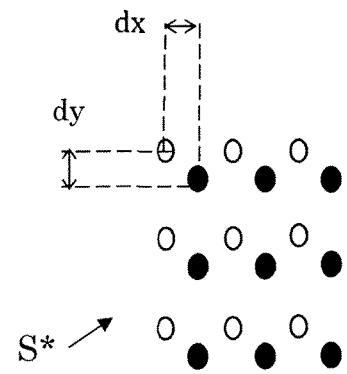
Fig. 19B
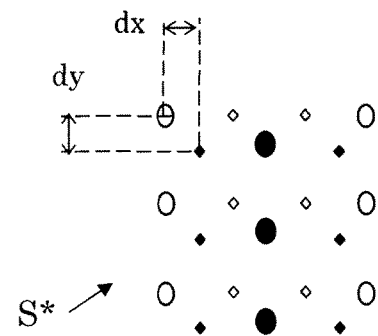
Fig. 19C

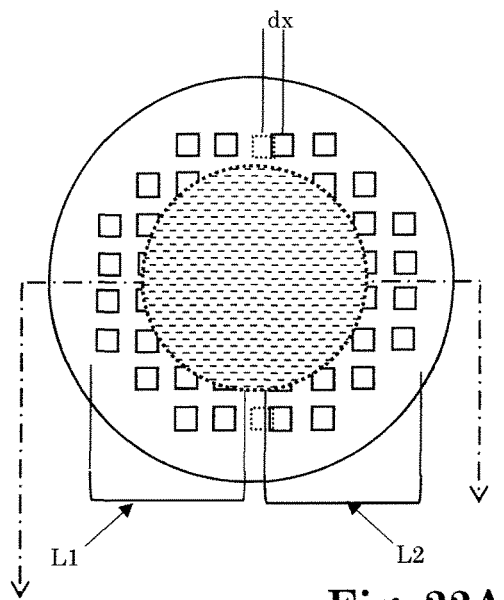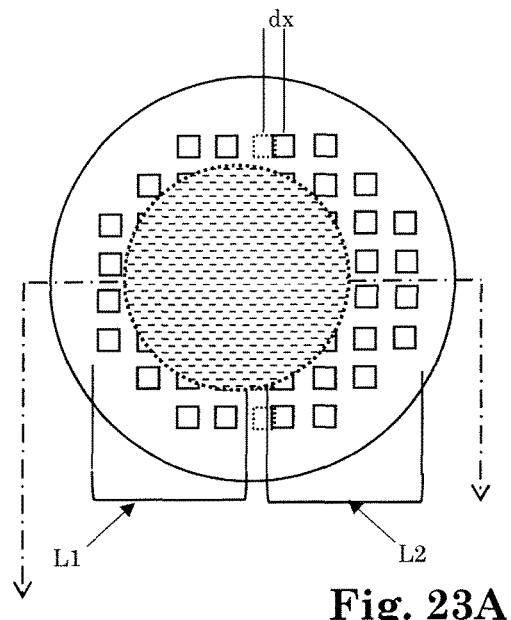
Fig. 22A  Fig. 23A
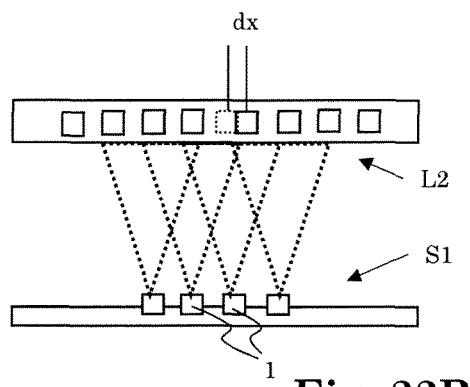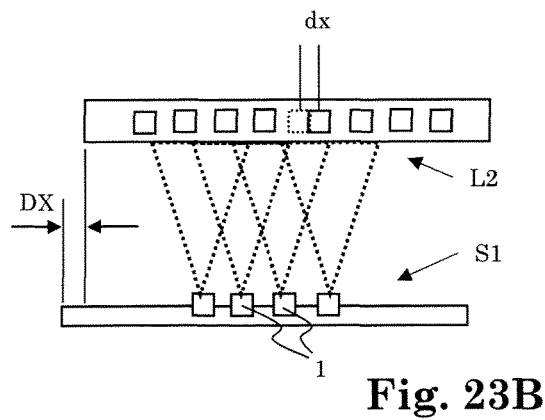
Fig. 22B  Fig. 23B

APPARATUS FOR PRODUCING PATTERNED ILLUMINATION USING ARRAYS OF LIGHT SOURCES AND LENSES

The disclosure relates to the field of optics and in particular to the generation of structured light and patterned illumination. It relates to corresponding apparatuses. In addition, the disclosure relates to devices producing and detecting structured light, e.g., for distance measuring or depth mapping purposes.

Definition of Terms

"Active optical component": A light sensing or a light emitting component. E.g., a photodiode, an image sensor, an LED, an OLED, a laser chip. An active optical component can be present as a bare die or in a package, i.e. as a packaged component.

"Passive optical component": An optical component redirecting light by refraction and/or diffraction and/or (internal and/or external) reflection such as a lens, a prism, a mirror (plane or curved), or an optical system, wherein an optical system is a collection of such optical components possibly also comprising mechanical elements such as aperture stops, image screens, holders.

"Replication": A technique by means of which a given structure or a negative thereof is reproduced. E.g., etching, embossing (imprinting), casting, molding.

"Light": Most generally electromagnetic radiation; more particularly electromagnetic radiation of the infrared, visible or ultraviolet portion of the electromagnetic spectrum.

Structured light can be used, e.g., in applications where distances to objects present in a scene shall be determined. Therein, a light pattern created in the scene by the structured light makes possible to distinguish bodies according to their distance from the apparatus emitting the structured light. Game consoles, for example, may comprise a pattern projector for illuminating a scene with structured light in which a player is present, while the so-illuminated scene is imaged and analyzed so as to achieve a 3D mapping of the scene, also referred to as depth mapping.

Structured light is often also referred to as encoded light or patterned light, such that these terms are, in the present patent application, used interchangeably. The term "structured light" is mostly used when the light is evaluated for determining distances by means of triangulation techniques. "Patterned light", on the other hand, is mostly used when the light is evaluated for determining distances using stereovision, wherein the light is in this case typically used for contrast enhancement.

Some examples of related art are discussed briefly below.

U.S. Pat. No. 7,970,177 B2, for example, describes an apparatus for distance calculation based on the generation of structured light using diffractive optical elements.

US 2012/038986 A1 describes a pattern projector using diffractive optical elements.

US 2010/118123 A1 describes an apparatus for mapping an object including an illumination assembly which includes a single transparency containing a fixed pattern of spots. Therein, a light source transilluminates the single transparency with optical radiation so as to project the pattern onto the object.

US 2013/038941A1 describes an optical apparatus including a matrix of light sources arranged on a substrate with a predetermined, uniform spacing between the light sources. A microlens array of the same uniform spacing is arranged close to the microlens array, so as to collimate the light emitted from the light sources and establish a beam homogenizer.

WO 2014/083485A1 describes a laser device for projecting a structured light pattern onto a scene comprising several arrays of semiconductor lasers.

U.S. Pat. No. 8,320,621 discloses a projector for use in a 3-D imaging device. The projector includes a light source formed of a vertical-cavity surface-emitting laser, or VCSEL array. The light from the VCSEL array is focused through a collimating micro-lens array consisting of a plurality of lenses, one lens for each VCSEL. The micro-lens array serves to focus and direct the beams from the VCSEL array to a DOE. The DOE forms the beams into any of a variety of light patterns which in turn enable 3-D imaging.

One object of the present disclosure is to describe an apparatus for producing structured light which is particularly shallow in the direction parallel to the direction of light emission.

Another object of the disclosure is to describe an apparatus for producing structured light which requires a particularly small number of constituents only.

Another object of the disclosure is to describe an apparatus for producing structured light which provides a good contrast over a particularly large range of distances from the apparatus.

Another object of the disclosure is to describe an apparatus for producing structured light which can create particularly high contrast patterns.

Another object of the disclosure is to describe an apparatus for producing structured light of particularly high intensity, in particular when considered relative to the intensity of the light initially produced within the apparatus.

Another object of the disclosure is to describe an apparatus for producing structured light which can produce relatively simple light patterns.

Another object of the disclosure is to describe an apparatus for producing structured light which can produce relatively complicated light patterns.

Another object of the disclosure is to describe an apparatus for producing structured light, which can be manufactured with relatively loose alignment tolerances.

Another object of the disclosure is to describe an apparatus for producing structured light, which has a good manufacturability.

Another object of the disclosure is to describe an apparatus for producing structured light, which can be manufactured with relatively high yield.

Another object of the disclosure is to describe a device which can be designed with standardized modules.

Another object of the disclosure is to describe a device having improved capabilities for evaluating detected structured light.

Further objects and various advantages emerge from the description and embodiments below.

One or more of the objects are at least partially achieved by apparatuses according to the subject matter described in this disclosure.

The present inventors have discovered that for certain selections of a lens pitch P of a microlens array (MLA) and of a distance D of the MLA to a light source illuminating the MLA—which we want to refer to as "illumination unit"—, a contrast in structured light thereby produced is particularly strong, wherein the selection also depends on the wavelength of the light emitted by the illumination unit. Accordingly, in those specific cases, patterns of particularly high contrast can be projected onto a scene.

The inventor's findings show some analogies to an optical effect discovered by Ernst Lau in 1948 ("Lau Effect"). The Lau Effect is described, e.g., in a paper by J. Jahns and A. W. Lohmann published in March 1979 in "OPTICS COMMUNICATIONS", Volume 28, number 3, titled "THE LAU EFFECT (A DIFFRACTION EXPERIMENT WITHIN COHERENT ILLUMINATION)". Lau's original experimental setup comprises an extended white light source illuminating a first grating behind which another grating is present which has the same slit separation as the first grating, and finally a converging lens images the light exiting the second grating into an observation plane. Lau has been able to observe fringe patterns for the case that the following equation has been met:

$$z0 = nd^2/2\lambda, \ (n=1,2,3,4,\ldots) \text{ wherein}$$

z0 is the distance between the two gratings, d is the grating constant of the gratings (slit separation), and λ designates a wavelength emitted by the light source, namely the wavelength of the light forming the observed fringe pattern.

Despite the significant differences from the present invention, understanding the Lau Effect can aid, to some extent, in understanding the functioning of the apparatus and techniques of the present invention.

Another, but rather well-known, optical effect is an effect in coherent optics called Talbot Effect (or "Talbot self-imaging") discovered in 1836 by Henry Fox Talbot. The Talbot Effect is also described in the above-mentioned paper by J. Jahns and A. W. Lohmann. While the Lau Effect and the Talbot Effect can both be considered to relate to self-imaging of a grating, they differ at least in that Talbot described using a monochromatic point light source (instead of the extended white light source employed by Lau), and in that Lau places two gratings behind one another, whereas Talbot uses a single grating only.

Talbot had discovered that behind the grating illuminated by the monochromatic light source, interference patterns are observable in planes which are aligned parallel to the grating and which are at specific distances from the grating. Those specific distances behind the grating are $$2d^2/\lambda$$

and integer multiples thereof, wherein d designates the grating constant of the grating and λ the wavelength of the monochromatic light source.

The present inventors discovered that particularly high contrast can be achieved if apertures of light sources of the illumination unit are in a common plane, which we refer to as an emission plane.

The present inventors also have recognized that particularly high contrast can be achieved if the illumination unit is a periodic light source.

A corresponding apparatus proposed by the inventors can be described as an apparatus for producing structured light, which includes a first optical arrangement including:
- a microlens array including a multitude of microlenses which are regularly arranged at a lens pitch P, wherein the microlenses can be transmissive microlenses or reflective microlenses;
- an illumination unit for illuminating the microlens array; wherein the illumination unit includes an array of light sources (LSA) for emitting light of a wavelength L each and having an aperture each. The apertures are located in a common plane (the emission plane), and the emission plane is located at a distance D from the microlens array. The special condition for the particularly high contrast in the produced structured light (and patterned illumination) interlinks the lens pitch P, the distance D and the wavelength L as follows:

$$P^2 = 2LD/N,$$

wherein N is an integer with $N \geq 1$.

For small N, e.g., $N \leq 8$, in particular $N \leq 5$, the distance D is relatively small such that the first optical arrangement (and thus often also the apparatus) can be rather shallow. As further discovered by the present inventors, the contrast achievable is apparently very high for such low N. In some experiments, N in the range of 1 to 4 can provide very good contrast, in particular N=2.

The apparatus can also be considered an apparatus for producing patterned illumination.

The apertures do not need to be separable from the light sources. E.g., for a semiconductor laser, the active area from which the light is emitted establishes the aperture.

The apertures are mentioned mainly for the reason that by them, the location of the light emission is defined and thus, they make possible to define the distance D from the MLA.

The emission plane can be aligned parallel to the microlens array.

The wavelength L is a wavelength of light emitted by the light sources. In case the light sources are lasers, it is simply the (medium) wavelength of the emitted laser radiation. In case of light sources emitting a mixture of wavelengths, wavelength L can, in principle, be any of the emitted wavelengths. But in any event, a particularly good contrast is present for those wavelengths L for which the above-cited equation is fulfilled, while other wavelengths superimpose patterns created by wavelengths L—which can result in a blurring of the patterns at wavelengths L. Therefore, wavelength L can be a peak wavelength in a wavelengths spectrum of the respective light source.

Wavelengths L may in particular be in an invisible range of light, particular in the infrared light range.

In some embodiments, all the microlenses of the multitude of microlenses are congeneric microlenses.

Lens pitches P are, e.g., between 5 μm and 250 μm, such as, e.g., between 10 μm and 150 μm.

In some embodiments, all the light sources of the array of light sources are congeneric light sources.

As described above, the microlenses can be transmissive or reflective.

Transmissive microlenses are transparent to at least a portion of the light emitted from the illumination unit; accordingly, light emitted from the illumination unit may propagate, at least in part, through the microlenses. The transmissive microlenses can be diffractive and/or refractive microlenses. For example, the transmissive microlenses may be athermalized microlenses or other hybrid lenses.

Reflective microlenses reflect at least a portion of the light emitted from the illumination unit. They can also be understood as structured (and thus not-flat) micromirrors, e.g., curved micromirrors. In case of reflective microlenses, the microlens array (MLA) can thus be considered a micromirror array. The microlenses/micromirrors are, however, usually not individually movable and can rather be in a fixed position with respect to the rest of the microlens array/micromirror array. Each of the reflective microlenses may have a surface which is smooth and curved (like a refractive lens) and/or may be structured with diffractive structures (like a transparent diffractive lens).

In some embodiments, the microlenses are transmissive refractive microlenses.

In one embodiment, the microlenses are collecting lenses (converging lenses), e.g., convex lenses.

In another embodiment, the microlenses are dispersing lenses, e.g., concave lenses.

A lens aperture of the microlenses may be circular, but may also be (non-circular) elliptical. And also polygonal lens apertures or still other lens aperture geometries are possible, e.g., rectangular, in particular square ones, hexagonal ones or others. By choosing a suitable lens aperture geometry, it is possible to optimize (maximize) the percentage of light transmitted by and reflected by the MLA to finally contribute to the produced illumination pattern.

The fact that the structured light originates from an interference pattern created by interference of light propagating from different ones of the microlenses makes possible that the contrast of the structured light remains substantially constant over a wide range of distances from the MLA, usually in the whole far field, which is at least from, e.g., 5 cm or 10 cm to infinity. The herein described apparatus does not require a patterned slide for achieving a patterned illumination. And also an imaging lens (or even a multi-lens imaging system) may be dispensed with.

The microlenses, i.e. their shape, define the field of view of the first optical arrangement, i.e. the angular range into which the structured light is (predominantly) emitted by the first optical arrangement (absence of additional optical components influencing the path of light emitted from the first optical arrangement assumed).

Therefore, for various applications, it can be advantageous to provide the microlenses as aspherical lenses. For example, the microlenses can be structured for creating a rectangular envelope for the structured light. E.g., the microlenses can have a focal length f1 along a first axis perpendicular to an optical axis of the microlens which is smaller than a focal length f2 along a second axis perpendicular to an optical axis of the microlens and perpendicular to the first axis.

In some embodiments, each of the light sources is arranged to illuminate a respective subset of the multitude of microlenses, and each of the subsets includes a plurality of neighboring microlenses, such that light from each particular one of the light sources passes through different ones of the microlenses in the respective subset so as to produce an interference pattern.

In some embodiments, the MLA is a two-dimensional MLA. But in other embodiments, the MLA is a one-dimensional MLA. In the latter case, the microlenses are arranged along a line; cylindrical lenses can in this case be particularly suitable.

In case of a two-dimensional MLA, there may be two lens pitches which may differ from each other, namely one pitch for each of two different directions such as for two symmetry axes. In case of rectangular lens arrangements, the two directions are mutually perpendicular, and for hexagonal arrangements, the directions enclose an angle of 60°. However, in some embodiments with a two-dimensional MLA, those two lens pitches are identical.

In one embodiment, the array of light sources (LSA) includes light sources which are regularly arranged at a pitch Q (light source pitch Q).

Light source pitches Q can be, e.g., between 5 µm and 250 µm, such as, e.g., between 10 µm and 150 µm.

In some embodiments, the LSA is a two-dimensional LSA. But in other embodiments, the LSA is a one-dimensional LSA. In the latter case, the light sources are arranged along a line.

In some embodiments, the light sources of the LSA are arranged on a common plate-shaped substrate, wherein an emission direction of the light sources (and thus the optical axis) is perpendicular to the plate described by the substrate.

In principle, pitch Q may be selected independently of lens pitch P. However, in case that both pitches P and Q are distances of microlenses and of light sources, respectively, positioned along lines which are parallel to each other ("mutually parallel MLA and LSA"), it turned out that particularly high contrasts in the structured light can be achieved if P=Q applies.

Good contrasts are also obtainable in case pP=qQ with p and q being integers of at least one (p≥1, q≥1) with no common factor. The inventors determined that in this case, illumination patterns can be produced which have an increased complexity, in particular an enlarged and more complex unit cell (with respect to the case of P=Q).

However, relatively high values of p and q tend to result in decreased contrast in the structured light, such that p≤8 and q≤8 is often favorable.

In some embodiments, the microlenses of the LMA are arranged on a rectangular grid, or even on a square grid, but also other geometries are possible, e.g., a hexagonal periodic arrangement.

In some embodiments, the light sources of the LSA are arranged on a rectangular grid, or even on a square grid, but also other geometries are possible, e.g., a hexagonal periodic arrangement. They can occupy all grid points, but alternatively, in some embodiments, some grid points are not occupied by a light source.

The inventors discovered that the provision of an MLA and an LSA both having regular arrangements of the same geometry which are aligned parallel to each other can make possible to achieve particularly high contrasts, e.g., the provision of rectangular arrangements of the same aspect ratio for both, the MLA and the LSA, corresponding sides of the rectangles of the MLA and of the LSA being aligned parallel to each other ("mutually parallel MLA and LSA").

Similarly, mutually parallel arranged hexagonal (or other) geometries of the microlens array and of the array of light sources tend to provide increased contrast.

In particular, for the above-mentioned case of pP=qQ (with integers p, q having no common factor), useful illumination patterns having a large unit cell and a large periodicity can be obtained. Analogously, the same holds for the case that there are two potentially different pitches (P1, P2) of the lenses along different axes and two potentially different pitches (Q1, Q2) of the light sources along different axes, at least if it is provided that p1P1=q1Q1 and p2P2=q2Q2, with integers p1, q1 having no common factor and integers p2, q2 having no common factor; and more particularly wherein the axis along which the lenses have pitch P1 is aligned parallel to the axis along which the light sources have pitch Q1, and wherein the axis along which the lenses have pitch P2 is aligned parallel to the axis along which the light sources have pitch Q2 ("mutually parallel MLA and LSA").

The inventors determined that the position of potential (i.e. possible) light intensity maxima in the produced illumination pattern is determined by the periodicity (or periodicities) of the MLA, while the periodicity (or periodicities) of the LSA can be used for adjusting relative intensities at said positions of potential light intensity maxima in the illumination pattern.

In one embodiment, the illumination unit is structured and configured for emitting spatially incoherent light. It is, alternatively, also possible to provide that the illumination unit emits spatially coherent light.

For example, the light sources may be light generators which are separate from each other (and, altogether, produce spatially incoherent light)—in contrast, e.g., to the provision of only one light generator such as one laser, plus a grating, the laser illuminating the grating and the light emitted through slits of the grating constituting the light sources (which results in spatially coherent light being emitted from the illuminating unit).

In some embodiments, the illuminating unit includes an array of VCSELs, i.e. of vertical-cavity surface-emitting lasers. An array of VCSELs can make possible the emission of spatially incoherent light at very high intensity.

In some embodiments, the illuminating unit is an array of VCSELs.

The provision of VCSELs as light emitters can make possible the design of apparatuses which are very small-sized in the vertical direction, i.e. along the optical axis, along the emission direction. And small pitches Q are also easier to realize using VCSEL than using edge-emitting lasers.

In one embodiment, an emission direction of the VCSELs of the array of VCSELs is parallel to an optical axis of the MLA.

In one embodiment, a light path between the illuminating unit and the MLA is free of additional optical elements, at least free of optical elements having optical power.

In one embodiment, a reference plane at the MLA for determination of the distance D is referred to as lens plane, wherein the lens plane includes peripheral points of the microlenses. In case not all peripheral points of the microlenses are in the same plane, the lens plane is defined as that plane including peripheral points of the microlenses which is farthest away from the illumination unit.

In practice, the distances D can be so much larger than a vertical extension (extension along the optical axis) of the microlenses that it is sufficiently precise to define the lens plane as the plane in which the microlenses are located.

Of course, the distance D is always determined in a direction perpendicular to the MLA—which in particular can also be a direction perpendicular to the above-mentioned emission plane. This can be the case when the distance D to be used in the above equation is identical with the geometrical distance between the apertures (emission plane) and MLA. In other words, when the optical path length of the light coincides with the length of a direct straight line connection between aperture and MLA. However, this is not necessarily the case. As will be explained further below, there are embodiments in which the optical path length (which is to be used as distance D in the equations above) differs therefrom.

In one embodiment, each of the light sources is structured and arranged to illuminate a set of said multitude of microlenses, the set including a plurality of neighboring microlenses. This way, it may be ensured that light from a single one of the light sources results in light propagating from several (different) ones of the microlenses, such that an interference pattern evolves. E.g., each microlens may be illuminated by at least two or rather at least ten of the light sources.

And moreover, it can be provided that sets of microlenses illuminated by neighboring ones of the light sources are overlapping, i.e. the set of microlenses illuminated by a first light source and the set of microlenses illuminated by a second light source neighboring the first light source have at least one microlens in common. Such an overlap on the MLA of light emitted from neighboring light sources can, in particular when lasers such as VCSELs are used as light sources, reduce or even eliminate speckle formation in a pattern produced by the structured light, i.e. in the illumination pattern.

In some embodiments, each of the light sources has an emission cone of at least 5° or rather at least 10° average opening angle ("average" for the case that the emission cones are not rotationally symmetric).

In order to produce structured light of a more complex composition, so as to produce more complex illumination patterns, it is possible to apply various variations to the described apparatus. For example, it is possible to combine two or more optical arrangements of the described kind in a single apparatus. E.g., two or three arrangements may be combined, or four arrangements, e.g., each located on a corner of a rectangle, may be combined. And it is also possible that in an optical arrangement, one and the same MLA is illuminated by two or more LSAs, or one and the same LSA illuminates two or more MLAs; which can also be considered as two optical arrangements sharing an MLA or an LSA.

In one embodiment, the apparatus includes a second optical arrangement which includes
  a second microlens array (second MLA) including a multitude of transmissive or reflective second microlenses which are regularly arranged at a lens pitch P2;
  a second illumination unit (second LSA) for illuminating the second microlens array;
the second illumination unit includes a second array of light sources for emitting light of a wavelength L2 each and having an aperture referred to as second aperture each, wherein the second apertures are located in a common plane referred to as second emission plane which is located at a distance D2 from the second microlens array, wherein for the lens pitch P2, the distance D2 and the wavelength L2 applies $$(P2)^2 = 2 \ast L2 \ast D2/N2$$

wherein N2 is an integer with N2≥1, and wherein
  the second microlens array and the microlens array of the first optical arrangement are not one and the same (in other words: the second microlens array and the microlens array of the first optical arrangement are different entities; or the second microlens array is different from—though optionally congeneric with—the microlens array of the first optical arrangement); or
  the second illumination unit and the illumination unit of the first optical arrangement are not one and the same (in other words: the second illumination unit and the illumination unit of the first optical arrangement are different entities; or the second illumination unit is different—though optionally congeneric with—from the illumination unit of the first optical arrangement); or
  both, the second microlens array and the microlens array of the first optical arrangement are not one and the same, and the second illumination unit and the illumination unit of the first optical arrangement are not one and the same.

In some instances in the following,
  the MLA of the first optical arrangement will be referred to as first MLA; and
  the LSA of the first optical arrangement will be referred to as first LSA; and
  the microlenses of the first optical arrangement will be referred to as first microlenses; and the light sources of the first optical arrangement will be referred to as first light sources; and the apertures of the first light sources will be referred to as first apertures; and lens pitch P is referred to as lens pitch P1; and wavelength L is referred to as wavelength L1; and distance D is referred to as distance D1; and integer N is referred to as integer N1.

In one embodiment, the second MLA and the first MLA are not one and the same, and the second MLA is shifted with respect to the first MLA. In this embodiment, the first and second MLAs are optionally congeneric MLAs. And furthermore optionally, the distances D1, D2 are identical. The first LSA and the second LSA may be one and the same, or the first LSA and the second LSA may be not one and the same; and it is possible that the first and the second LSA share a common set of their light sources. Optionally, wavelengths L1, L2 are identical in this embodiment.

In this embodiment, the first and second MLAs can have optical axes which are parallel to each other and which are parallel to emission directions of the first and second LSAs.

Both, the first and the second MLA may be included in a single optical component.

In another embodiment, the lens pitches P1 and P2 are different from each other. In this case, it is still possible to provide that distances D1 and D2 are identical (while fulfilling the above equations). This may be accomplished by providing, e.g., that wavelength L1, L2 and/or integers N1, N2 are selected accordingly. However, it can be provided that distances D1 and D2 are not identical in this case. And it can be provided that, light source pitches Q1, Q2 at which the first and second light sources, respectively, are arranged, are in this embodiment different from each other.

In yet another embodiment, the wavelengths L1 and L2 are different from each other. In this case, distances D1 and D2 can be different from each other, too, and/or lens pitches P1, P2 can be different from each other, too.

In yet another embodiment, the first and second MLAs are rotated with respect to each other. More particularly, both, the first MLA and the second MLA are of rectangular geometry (this includes also the case of square geometry) with two mutually perpendicular symmetry axes each, and the symmetry axes of the second MLA are at an angle $\varphi$ with the symmetry axes of the first MLA for which applies $0°<\varphi\leq 45°$, e.g., $1°<\varphi\leq 10°$. Similarly, also two MLAs of hexagonal geometry may be rotated with respect to each other.

In some embodiments, the array of light sources includes a first group of light sources each of which is located on a lattice point of a first lattice and, in addition, a second group of light sources each of which is located on a lattice point of a second lattice, wherein the light emitters of the first group and the light emitters of the second group are interspersed. The first and second lattices are not one and the same; but they can be congeneric—in which case they can be mutually shifted or rotated.

Similarly, one can say that the light emitters of the first group and the light emitters of the second group are interlacing or are positioned in an interlacing manner.

The first and the second lattices can be considered mutually superimposed lattices.

This can safe space and/or can contribute to a more uniform illumination of the MLA.

The light sources of the first and of the second group of light sources can be congeneric light sources. But alternatively, they can have different properties.

Each group can include, e.g., at least 10 light emitters, or, e.g., as at least 40 light emitters.

The first and second lattices can be of identical dimensions and can be aligned parallel to each other, and in instances, the second lattice is shifted with respect to the first lattice.

In an example, the first and second lattices are both rectangular lattices having a lattice constant Qx along an x-axis and having a lattice constant Qy along a y-axis. The x-axis can be aligned perpendicular to the y-axis.

Qx and Qy can be considered to correspond to light source pitches, wherein, however, each group of light sources would then have to be viewed separately from the other(s).

In some embodiments, the second lattice is shifted with respect to the first lattice by a shift which is along the x-axis a non-integer multiple of Qx and/or along the y-axis a non-integer multiple of Qy, e.g., by a shift of between (nx+0.01) times Qx and (nx+0.99) times Qx along the x-axis and, optionally, also by a distance of between (ny+0.01) times Qy and (ny+0.99) times Qy along the y-axis, wherein nx≥0 and ny≥0 are integers.

In some embodiments, a plurality of lattice points of the first lattice is not occupied by a light source of the first group. This can improve manufacturability of the LSA. E.g., manufacturing constraints may require a minimum distance between (neighboring) light sources, and this minimum distance would have to be undercut if a light source would be present at each lattice point of all lattices.

The phrase "is not occupied by a light source . . . " can also be worded as "is free from a light source . . . ". In other words, there is no light source present at any of said plurality of (not occupied) lattice points.

Similarly, it can be provided alternatively or in addition that a plurality of lattice points of the second lattice is not occupied by a light source (of the second group).

In some embodiments, we want to refer (for increased clarity) to the microlens array as "first microlens array", and the first optical arrangement includes, in addition to the first microlens array, a second microlens array, and the first and the second microlens arrays are included in one and the same single-piece substrate. This way, space savings and/or an improved manufacturability can be achievable.

The second microlens array can be located at the before-mentioned distance D from the common emission plane.

In instances, the first and the second microlens arrays are congeneric microlens arrays which are shifted with respect to each other in a direction parallel to the emission plane.

A component of the shift along an axis along which the microlenses of the first and of the second microlens array both have pitch P can be a non-integer multiple of pitch P. I.e. said component can be, e.g., between (n+0.01) times P and (n+0.99) times P, wherein n≥0 is an integer.

The second microlens array can include a multitude of transmissive or reflective microlenses which are regularly arranged at a lens pitch PP which is different from the lens pitch P. However, in other embodiments, the lens pitches of the first and second MLS are equal.

Similarly to what has been described above for the first and second MLAs, the illumination unit can (alternatively or in addition) include two (or more) LSAs. Accordingly:

In some embodiments, the array of light sources can be (for increased clarity) referred to as "first array of light sources", and the illumination unit includes, in addition to the first array of light sources, a second array of light sources, the first and the second arrays of light sources being included in one and the same single-piece substrate.

In instances, each of the light sources of the second array of light sources has an aperture which is located in the common emission plane.

In instances, each of the light sources of the second array of light sources is operable to emit light of the wavelength L. But alternatively, light sources of the second array of light sources can be operable to emit light of a wavelength which is different from wavelength L In some embodiments, the first and the second arrays of light sources are congeneric arrays of light sources which are shifted with respect to each other in a direction parallel to the emission plane. E.g., a component of the shift along an axis along which the light sources of the first and of the second microlens array both have a pitch Q is a non-integer multiple of pitch Q. I.e. said component can be, e.g., between (n+0.01) times Q and (n+0.99) times Q, wherein n≥0 is an integer.

In instances, the second array of light sources includes a multitude of light sources which are regularly arranged at a light source pitch QQ which is different from the light source pitch Q. However, in other embodiments, the light source pitches of the first and second LSA are equal.

Furthermore, in some embodiments, the first optical arrangement includes, in addition to the microlens array, further (m−1) microlens arrays, wherein m is an integer with m≥3.

In instances, each of the m microlens arrays is adjoining two neighboring ones of the m microlens arrays at respective border lines. This can contribute to saving space taken by the MLAs and/or simplify achieving a uniform illumination of the MLAs.

The border lines can be, e.g., straight lines.

In some embodiments, the border lines of all m microlens arrays are adjoining at a common point.

In instances, the respective border lines of each of the m microlens arrays are at an angle of 360°/m with respect to each other.

In instances, at least a first and a second of the microlens arrays are congeneric microlens arrays which are rotated with respect to each other.

In instances, at least a first of the microlens arrays has a pitch PP which is different from the pitch P.

In instances, at least a first and a second of the microlens arrays are congeneric microlens arrays which are shifted with respect to each other. E.g., a component of the shift along an axis along which the microlenses of the first and of the second microlens array have pitch P can be a non-integer multiple of pitch P. I.e. said component can be, e.g., between (n+0.01) times P and (n+0.99) times P, wherein n≥0 is an integer.

Similarly to what has been described above for the m≥3 MLAs, the illumination unit can (alternatively or in addition) include M≥3 LSAs. ("m" and "M" can be different integers, but can, in instances, be equal.) Accordingly:

In some embodiments, the illumination unit includes, in addition to the array of light sources, further (M−1) arrays of light sources, wherein M is an integer with M≥3.

In instances, each of the M arrays of light sources is adjoining two neighboring ones of the M arrays of light sources at respective border lines. The border lines can be, e.g., straight lines The border lines of all M arrays of light sources can be adjoining at a common point.

The respective border lines of each of the m arrays of light sources can be at an angle of 360°/M with respect to each other.

In instances, at least a first and a second of the arrays of light sources are congeneric arrays of light sources which are rotated with respect to each other.

In instances, at least a first of the arrays of light sources has a pitch QQ which is different from the pitch Q.

In instances, at least a first and a second of the arrays of light sources are congeneric arrays of light sources which are shifted with respect to each other. E.g., a component of the shift along an axis along which the light sources of the first and of the second array of light sources have pitch Q can be a non-integer multiple of pitch Q. I.e. said component can be, e.g., between (n+0.01) times Q and (n+0.99) times Q, wherein n≥0 is an integer.

For achieving particularly uniform illumination of MLAs and/or for achieving an increased complexity of the structured light, i.a. embodiments can be used in which the initially described apparatus includes, in addition, a second optical arrangement which includes a second microlens array including a multitude of transmissive or reflective second microlenses which are regularly arranged at a lens pitch P2; and a second illumination unit for illuminating the second microlens array.

And the second illumination unit includes a second array of light sources for emitting light of a wavelength L2 each and having an aperture referred to as second aperture each. And the second apertures are located in a common plane referred to as second emission plane which is located at a distance D2 from the second microlens array, wherein $(P2)^2 = 2*L2*D2/N2$, and wherein N2 is an integer with N2≥1. The second microlens array and the microlens array of the first optical arrangement are separate microlens arrays, and the second array of light sources and the array of light sources of the first optical arrangement are separate arrays of light sources. I.e the arrays of light sources are not one and the same, and the microlens arrays are not one and the same.

The microlens arrays can be but need not be included in one and the same single-piece component.

The arrays of light sources can be but need not be included in one and the same single-piece component.

In instances, the light sources of the first optical arrangement are structured and arranged not to illuminate the second microlens array, and the light sources of the second array of light sources are structured and arranged not to illuminate the microlens array of the first optical arrangement. This way, the apparatus can have separate, independent channels.

In some embodiments, the second microlens array and the microlens array of the first optical arrangement can be congeneric arrays of microlenses.

In some embodiments, the second array of light sources and the array of light sources of the first optical arrangement can be congeneric arrays of light sources.

In some embodiments, an axis along which the microlenses of the microlens array of the first optical arrangement have pitch P and an axis along which the microlenses of the second microlens array have pitch P2 are aligned parallel to each other.

In some embodiments, P2 is equal to P, and the second microlens array is shifted with respect to the microlens array of the first optical arrangement in a direction parallel to the emission plane. Such mutual shifts of MLAs can make possible to produce structured light of higher complexity. Especially if a component of the shift along an axis along which the microlenses of the first and of the second microlens array have pitch P is a non-integer multiple of pitch P. I.e. said component can be, e.g., between (n+0.01) times P and (n+0.99) times P, wherein n≥0 is an integer.

In some embodiments, furthermore the light sources of the first optical arrangement are regularly arranged at a light source pitch Q, and the light sources of the second array of light sources are regularly arranged at a light source pitch Q2, and an axis along which the light sources of the first optical arrangement are arranged at pitch Q is aligned parallel to an axis along which the light sources of the second array of light sources are arranged at pitch Q2. In instances, Q=Q2 can be (but needs not be) provided.

In some embodiments, P is equal to Q. Thus, P=Q=P2=Q2 can be provided.

In some embodiments, an axis along which the light sources of the array of light sources of the first optical arrangement have pitch Q and an axis along which the light sources of the second array of light sources have pitch Q are aligned parallel to each other.

In some embodiments, the second array of light sources is shifted with respect to the array of light sources of the first optical arrangement in a direction parallel to the emission plane.

E.g., the second array of light sources can be shifted with respect to the second microlens array in the same way (i.e. in the same direction and by the same distance) as is the array of light sources of the first optical arrangement shifted with respect to the microlens array of the first optical arrangement. In an alternative, the second array of light sources can be shifted with respect to the second microlens array in the same way (i.e. in the same direction and by the same distance) as is the second microlens array shifted with respect to the microlens array of the first optical arrangement.

Thus, e.g., the first and the second optical arrangements can be congeneric optical arrangements, wherein the emission plane of the first optical arrangement coincides with the second emission plane, and the first and the second optical arrangements are shifted with respect to one another.

The shift can be a shift having a component along an axis along which the microlenses of the first and of the second microlens array have pitch P which is different from an integer multiple of pitch P.

Not only relative shifts of MLAs, but also mutual rotations of MLAs can be provided for achieving an increased complexity of the structured light. For example:

In some embodiments, P2 is equal to P, and the second microlens array is rotated with respect to the microlens array of the first optical arrangement by an angle φ. An axis of rotation can be aligned perpendicular to the emission plane; wherein the emission planes for all light source arrays of the apparatus can be parallel to each other and can even coincide with each other.

In some embodiments, the light sources of the first optical arrangement are regularly arranged at a light source pitch Q, and the light sources of the second array of light sources are regularly arranged at a light source pitch Q2, and an axis along which the light sources of the first optical arrangement are arranged at pitch Q is at an angle amounting to angle φ with an axis along which the light sources of the second array of light sources are arranged at pitch Q2.

In instances, Q=Q2 applies.

And furthermore, P=Q can apply.

Thus, e.g., the first and the second optical arrangements can be congeneric optical arrangements wherein emission plane of the first optical arrangement the coincides with the second emission plane, and the first and the second optical arrangements are rotated with respect to one another.

The rotation angle φ can amount to between 5° and 40°.

Structured light of increased complexity can be produced, e.g., using two or more MLAs, in particular when these are mutually rotated, wherein particularly small angles of rotation can in instances be useful.

In some embodiments, for example, the microlens array is (for increased clarity) referred to as first microlens array, and the first optical arrangement includes, in addition to the first microlens array,
 a second microlens array including a multitude of transmissive or reflective second microlenses which are regularly arranged at lens pitch P'; and
the second microlens array is rotated with respect to the first microlens array, and light sources of the array of light sources are structured and arranged to illuminate the second microlens array.

Both, the first and the second microlens arrays can be illuminated by the array of light sources.

In instances, both, the first and the second microlens array can be embodied as separate entities or in one and the same single-piece optical component. E.g., they can be simultaneously manufactured by the very same process steps and/or in one and the same substrate.

In some embodiments, the first and the second microlens arrays are congeneric microlens arrays.

In some embodiments, P is equal to P'.

In some embodiments, the light sources of the array of light sources are regularly arranged at a light source pitch Q. Therein, P=Q can be (but needs not be) the case.

In some embodiments, an axis along which the light sources are arranged at the pitch Q is aligned parallel within 5° to both, to an axis along which the microlenses of the first microlens array are arranged at the pitch P and to an axis along which the microlenses of the second microlens array are arranged at the pitch P'. Therein, e.g., the axis along which the light sources are arranged at the pitch Q can be aligned parallel to the axis along which the microlenses of the first microlens array are arranged at the pitch P.

In some embodiments, the second microlens array is rotated with respect to the first microlens array by more than 0° and by at most 5°. For example, the second microlens array can be rotated with respect to the first microlens array by at least 0.1° and by at most 4°.

In some embodiments, the first microlens array and the second microlens array are both of rectangular geometry having two mutually perpendicular symmetry axes each, and an angle φ between the symmetry axes of the first microlens array and the symmetry axes of the first microlens array amounts to more than 0° and to at most 5°.

The angle φ can amount to at least 0.1°.

The angle φ can amount to at most 4°.

Similarly to MLAs with relatively small mutual rotation, also LSAs with relatively small mutual rotation can be provided in an apparatus. E.g., in embodiments in which the light sources of the array are regularly arranged at a light source pitch Q, and wherein (for increased clarity) the array of light sources is referred to as first array of light sources, and wherein the illumination unit includes, in addition to the first array of light sources,
 a second array of light sources which is congeneric with the first array of light sources; and
wherein the second array of light sources is rotated with respect to the first array of light sources, and wherein light sources of the second array of light sources are structured and arranged to illuminate the microlens array.

Light sources of both, the first and the second array of light sources, can illuminate the microlens array.

The second array of light sources can be rotated with respect to the first array of light sources by, e.g., more than 0° and by at most 5° such as by at least 0.1° and by at most 4°.

It is possible to obtain structured light producing more complex patterns without having to provide an additional MLA and/or LSA. E.g., the first optical arrangement may include an additional optical component, in particular an additional optical component including at least one prism. The additional optical component may be an array of passive optical components, e.g., a prism array.

The MLA can be arranged (on the light path) between the LSA and the additional optical component.

The additional optical component can, in instances, be a prism array. The prism array includes a multitude of prisms and may be included in a single optical component, e.g., manufactured using a replication process such as injection molding or embossing.

E.g., the prism array may be plate-shaped and arranged parallel to the MLA.

The additional optical component can include a diffractive optical component.

In instances, the diffractive optical component can be structured and arranged to create at least two outgoing light rays from each incoming light ray exiting the microlens array.

Of course, the above refinements for producing patterned illumination of increased complexity may be pairwise combined or combined in groups of three or more. E.g., the provision of the additional optical component may be combined with one or more of the embodiments in which a second MLA and/or a second LSA is provided.

Structured light of increased complexity and, more particularly, more complex patterns produced by the apparatus may simplify a three-dimensional analysis of a scene illuminated by the structured light. More specifically, it may simplify the determination of distances from the apparatus to different portions of the scene.

The described apparatuses can also be considered pattern projectors or optical projection systems or optical apparatuses for projecting a light pattern into a field of view.

Apparatuses including at least one array of light sources have been described, but it is also possible to operate apparatuses which include merely a single light source. For example, the apparatus can be an apparatus for producing structured light, wherein the apparatus includes a first optical arrangement including:

a microlens array including a multitude of transmissive or reflective microlenses which are regularly arranged at a lens pitch P; and
an illumination unit for illuminating the microlens array.

And the illumination unit includes no more than a single light source for emitting light of a wavelength L, the light source having an aperture which is located at a distance D from the microlens array, wherein $$P^2 = 2LD/N,$$

and wherein N is an integer with N≥1.

The MLA can be any MLA described in the instant disclosure, and further MLAs can be included, too, as herein described.

It is possible to have the MLA illuminated by the single light source only.

The light source can be characterized by having no more than a single aperture (through which the light is emitted).

The aperture can be located in an emission plane (from which distance D is determined).

The light source can be structured and arranged to illuminate a range of the microlenses. The range can be a subset or can include all microlenses of the MLA.

In some embodiments, the light source is arranged to illuminate a range of the multitude of microlenses including a plurality of neighboring microlenses, such that light from the light source passes through different ones of the microlenses so as to produce an interference pattern.

The structured light can originate from the interference pattern.

In some embodiments, the light source is a laser.

In some embodiments, the light source is a vertical-cavity surface-emitting laser.

In some embodiments, the light source is an LED.

In some embodiments, the light source is a superluminescent light emitting diode.

The above examples correspond to implementations in which an optical path length of the light path along which the light propagates from the aperture to the MLA is identical with a geometrical distance from the aperture to the MLA. However, as already announced before, this is not necessarily the case. In some implementations, said geometrical distance is different from the optical path length; and in general, the distance D to be used in the equations above is said optical path length.

E.g., in some embodiments, some material having a refractive index different from 1 may be present along the optical path. And/or the light path along which the light propagates from the aperture to the MLA can be a folded light path.

Accordingly, we disclose an apparatus for producing structured light, wherein the apparatus comprises a first optical arrangement comprising:

a microlens array comprising a multitude of transmissive or reflective microlenses which are regularly arranged at a lens pitch P; and
an illumination unit for illuminating the microlens array.

And the illumination unit comprises one or more light sources for emitting light of a wavelength L each and having an aperture each, and wherein for each of the one or more light sources, an optical path length for light emitted from the respective light source from the respective aperture to the microlens array amounts to one and the same distance D, wherein $$P^2 = 2LD/N,$$

and wherein N is an integer with N≥1.

In some embodiments, the light emitted from each of the one or more light sources propagates from the respective aperture to the microlens array along a light path, wherein at least a portion of the light path is running through a material having a refractive index different from 1.

In some embodiments, the apparatus comprises at least one reflective element, and the light emitted from each of the one or more light sources propagates from the respective aperture to the microlens array along a light path along which it is reflected at least once by the at least one reflective element. E.g., one or more mirrors can be comprised in the apparatus which reflect light propagating along the light path.

Of course, the one or more light sources can comprise an array of light sources.

The various embodiments and features described above for the case where the optical path length is identical with the geometrical distance can, of course be applied also for the case that these two magnitudes differ from each other.

The present disclosure also describes a device including two or more apparatuses as herein described. E.g., the device can include an array of apparatuses.

The apparatuses can be arranged next to each other, e.g., on a rectangular grid.

In some embodiments, the device includes a controller for selectively switching on and off the respective illumination unit of one or more sub-groups of apparatuses including one or more of the apparatuses each.

The apparatuses can be congeneric apparatuses. Alternatively, at least two of the apparatuses are not congeneric.

In some embodiments, at least a first and a second of the apparatuses differ in at least one of the respective pitch P of the respective apparatus;
the respective wavelength L of the respective apparatus;
the respective distance D of the respective apparatus;
the respective integer N of the respective apparatus.

In some embodiments, the respective emission planes of the apparatuses are aligned parallel to each other. E.g., their emission planes can coincide, and, e.g., the apparatuses can also be congeneric apparatuses.

In some embodiments, an axis along which the microlenses of a first of the apparatuses have pitch P is aligned parallel to an axis along which the microlenses of a second of the apparatuses have pitch P. It can be provided, e.g., that the MLA of the first apparatus is shifted with respect to the MLA of the second apparatus. Such MLA shifts have been described before. They can, e.g., contribute to creating more complex structured light.

In other embodiments, an axis along which the microlenses of a first of the apparatuses have pitch P is aligned at an angle to an axis along which the microlenses of a second of the apparatuses have pitch P. The angle can amounts to, e.g., between 0.1° and 42°. Such mutual MLA rotations have been described before. They can, e.g., contribute to creating more complex structured light.

It can be provided that each of the apparatuses is an entity separate from the other apparatuses.

E.g., the apparatuses can be manufactured as separate devices, e.g., as modules. When designing a device, two or more of the apparatuses can be planned to be implemented in a single device. This can obviate the need to design a new apparatus when designing a new device. Costs of devices and of apparatuses can be kept low.

The device can be, e.g., a game console, a smart phone, a tablet computer, a portable computing device, a distance measuring device.

The present disclosure also describes a device including one or more apparatuses as herein described and, in addition, a detector. Such devices can be used, e.g., for carrying out distance measurements and/or for depth mapping.

More specifically, the device can include an apparatus as herein described and can further include a detector including an array of light sensitive elements regularly arranged on a grid describing two axes, wherein one of the two axes is (or two of the axes are) aligned at an angle with respect to an axis along which the microlenses have pitch P.

The angle can effect that an evaluation of data obtained by the detector can be better evaluated.

The detector can be operable for detecting light reflected from a scene illuminated by structured light emitted from the apparatus.

The detector can be, e.g., an image sensor.

The light sensitive elements can be, e.g., photosensitive pixels.

The grid can be a rectangular grid. The grid can also have another geometry, such as hexagonal.

The two axes of the detector can be mutually rectangular axes.

The device can be an optical device.

The device can be distance measuring device.

The angle can amount to between 5° and 40°. Further embodiments and advantages emerge from the dependent claims and the figures.

Below, the invention is described in more detail by means of examples and the included drawings. The figures show schematically:

FIG. 1 an illustration of an apparatus for producing structured light, in a side view;

FIG. 2 an illustration of a pattern created by structured light produced by the apparatus of FIG. 1;

FIG. 3 a graph illustrating contrast in patterns obtained for different numbers N1;

FIG. 4 an illustration of an apparatus for producing structured light, to scale, in a side view;

FIG. 5 an illustration of an MLA and an LSA, in a top view;

FIG. 6 an illustration of an MLA and an LSA, in a top view;

FIG. 7 an illustration of an alternative LSA to the LSA in FIG. 6, in a top view;

FIG. 8 an illustration of an apparatus for producing structured light of increased complexity, in a side view;

FIG. 9 an illustration of MLAs according to FIG. 8, in a top view;

FIG. 9A an illustration of 5 MLAs occupying a circular area, in a top view;

FIG. 9B an illustration of 3 MLAs occupying a rectangular area, in a top view;

FIG. 9C an illustration of 3 MLAs occupying a rectangular area, in a top view;

FIG. 10 an illustration of a pattern created by structured light produced by the apparatus of FIG. 8;

FIG. 11 an illustration of MLAs for producing structured light of increased complexity, in a top view;

FIG. 12 an illustration of a pattern created using the MLAs of FIG. 11;

FIG. 13 an illustration of MLAs for producing structured light of increased complexity, in a top view;

FIG. 14 an illustration of a pattern created using the MLAs of FIG. 13;

FIG. 15 an illustration of an apparatus for producing structured light of increased complexity using MLAs of FIG. 13, in a side view;

FIG. 16 an illustration of an alternative apparatus for producing structured light of increased complexity using MLAs of FIG. 13, in a side view;

FIG. 17 an illustration of an apparatus for producing structured light of increased complexity using a prism array, in a side view;

FIG. 18 an illustration of a pattern created using the apparatus of FIG. 17;

FIG. 19A an illustration of a detail of two mutually shifted LSAs which are arranged side-by-side, in a top view FIG. 19B an illustration of a detail of an LSAs with interdispersed light sources of different groups, in a top view;

FIG. 19C an illustration of a detail of the LSAs of FIG. 19B with open light sources removed from several lattice points, in a top view;

FIG. 20A an illustration of a detail of an LSAs with interdispersed light sources of three different groups, in a top view;

FIG. 20B an illustration of lattices of the light sources of FIG. 20A, in a top view;

FIGS. 21A-21D illustrations of a detail of LSAs obtainable from the LSA of FIG. 20A by leaving out light sources at certain ones of the lattice point, in a top view;

FIGS. 22A, 22B illustrations of an optical arrangement in which two mutually shifted MLAs are illuminated by one and the same LSA, in a top view and in a side view, respectively;

FIGS. 23A, 23B illustrations of the optical arrangement of FIGS. 22A, 22B in which a misalignment of LSA vs. MLA is illustrated, in a top view and in a side view, respectively;

FIGS. 24A, 24B illustrations of an optical arrangement in which two mutually shifted MLAs are illuminated by two LSAs, in a top view and in a side view, respectively;

FIG. 25 an illustration of an apparatus for producing structured light in which a only a single light source illuminates an MLA, in a side view;

FIG. 26 an illustration of a device including an array of apparatuses for producing structured light each;

FIG. 27A an illustration of a device including an apparatus and a detector;

FIG. 27B an illustration of a data set taken by the detector of the device of FIG. 27A;

FIG. 28 an illustration of an apparatus for producing structured light in which an MLA is illuminated through a block of material, in a side view;

FIG. 29 an illustration of an apparatus for producing structured light in which an MLA is illuminated by light propagating along a folded path, in a side view.

The described embodiments are meant as examples or for clarifying the invention and shall not limit the invention.

FIG. 1 shows a schematic illustration of an apparatus for producing structured light 5, in a side view. At the same time, FIG. 1 shows a schematic illustration of an optical arrangement for producing structured light 5. The apparatus (and the optical arrangement) includes a microlens array L1 (MLA L1) including a multitude of microlenses 2 which are regularly arranged at a pitch P1. Typically, the microlenses 2 are congeneric microlenses. The apparatus also includes an array S1 of light sources (LSA S1) by means of which MLA L1 is illuminated. LSA S1 includes a multitude of light sources 1 which are regularly arranged at a pitch Q1. Typically, the light sources 1 are congeneric light sources. And usually, light emitted from the light sources 1 travels on a light path to the MLA L1 which is free of any intervening surface having optical power.

In the illustrated case of FIG. 1 and also in most other Figures, the microlenses 2 are transparent refractive semi-concave microlenses. However, the microlenses 2 may alternatively be concave microlenses or convex microlenses of semi-convex microlenses. And they may furthermore alternatively be diffractive microlenses or diffractive-and-refractive microlenses, the latter also being referred to as hybrid microlenses. And the microlenses 2 may also be reflective microlenses. In the latter case, the structured surface of the microlens reflects light impinging on it.

In the illustrated case of FIG. 1 and also in most other Figures, only a small number of microlenses 2 is illustrated. However, in practice many more microlenses may be provided, and the same holds also for the relative small number of illustrated light sources drawn. E.g., in a line of neighboring microlenses, more than 20 microlenses may be present, and in a line of neighboring light sources, more than 10 light sources may be present.

In particular, LSA S1 can be an array of VCSELs, such that each of the light sources 1 is a VCSEL.

Light sources 1 emit light of a wavelength L (not indicated in the Figures) into an emission cone each, as indicated in FIG. 1, wherein the cones may have a circular cross-section but do not need to have a circular cross-section. Opening angles of the cones are typically between 2° and 120° or rather between 5° and 25°, e.g., about 10°. The emission cones are not free from overlap, as can be seen in FIG. 1 (dashed lines). The emission cones overlap, typically at least for immediately adjacent light sources 1, and optionally rather, each microlens 2 is illuminated by at least 6 light sources 1.

Light sources 1 may, for example, emit infrared light.

Each light source 1 illuminates several ones of the microlenses 2. A subset of microlenses illuminated by a single light source 1 can comprise e.g., more than 6 or more than 10 microlenses.

This way, light emitted from a specific light source 1 but having passed through different ones of the microlenses 2 can interfere so as to produce an interference pattern. Light emitted from another one of the light sources 1 produces, in the same way, the same interference pattern, such that, in the far field, e.g., beyond 2 cm or beyond 5 cm after having interacted with MLA L1, all the interference patterns superimpose. This way, the structured light 5 produces a high-intensity interference pattern which can be used to illuminate a scene or be caught on a screen.

Manufacture of an apparatus of the described kind is simplified by the fact that no precision lateral alignment of MLA L1 and LSA S1 is necessary for producing high-contrast illumination patterns. The x-y-tolerance (shifts in a plane parallel to the MLA plane/emission plane) is very high; z tolerances (distance between MLA and illumination unit) are relative loose; and also rotational alignment requirements are not very high.

A distance between LSA S1 (and, more particularly the light sources 1, rather their apertures) and MLA L1 (and, more particularly the microlenses 2) is referred to as D1.

FIG. 2 is a schematic illustration of a pattern 8 created by structured light 5 produced by the apparatus of FIG. 1. The pattern 8 is recorded in the far-field. The dark spots indicate locations of high light intensity, whereas white area indicates regions of low light intensity.

It turned out that for specific selections of pitches P1, wavelengths L1 and distances D1, a contrast present in such a pattern is particularly high, whereas for other distances, only much lower contrast is present in a created pattern.

A formula in which the decisive magnitudes P1, L1 and D1 are interconnected so as to obtain triplets P1, L1, D1 for which particularly sharp contrast in patterns 8 is obtained reads as follows:

$$(P1)^2 = 2*(L1)*(D1)/(N1).$$

Therein, N1 designates an integer which is at least 1. I.e. for N1=1 or 2 or 3 or 4, . . . , triplets P1, L1, D1 can be selected which fulfill the above equation, and thus, the parameters for an apparatus for high-contrast pattern generation are determined.

FIG. 3 shows a graph illustrating contrast in patterns 8 obtained for different numbers N1, wherein in the graph of FIG. 3, N1 is a continuous positive number, assigned to the horizontal axis. Along the vertical axis, a magnitude indicative of the contrast obtained in a pattern 8 is indicated.

As is obvious from FIG. 3 (cf. the small arrows), particularly high contrast is present if N1 is an integer. For the setup underlying the graph of FIG. 3, N1=2 promises highest contrast, and in the case of N1 being 1 or 3 or 4, also very high contrast patterns can be obtained. For higher integers N1, still a high contrast is obtained, which is clearly higher than contrast for non-integer numbers in between. However, illumination patterns may also be produced for non-integer factors instead of integer N, e.g., for 0.5 or 1.5.

If P1 and L1 are given (fixed), N1=1 results in a small value for D1 such that the apparatus can be rather shallow, i.e. small in the direction of light emission.

FIG. 4 is an illustration to scale and in a side view, of an apparatus for producing structured light. FIG. 4 illustrates, e.g., the case of P1=Q1=50 μm for N1=2 and L1=833 nm. The far-field in which the pattern 8 can be observed and recorded is much too far away to be illustrated in FIG. 4.

LSA S1 does not have to, but may be a regular array. And it turned out that particularly high contrast patterns can be obtained when MLA L1 and LSA S1 are mutually parallel arrays of the same geometry, wherein P1=Q1 applies. And still very high contrast patterns can be achieved if P1/Q1 amounts to 2 or 3 or 4 or to 3/2 or 4/3 or 5/2 or 5/4 or if Q1/P1 amounts to 2 or 3 or 4 or to 3/2 or 4/3 or 5/2 or 5/4. In fact, for p1P1=q1Q1 (with p1≥1 and q1≥1, p1 and q1 designating integers), illumination patterns can be produced which have an increased complexity, in particular illumination patterns which have a larger unit cell, and wherein the larger unit cell is repeated with a larger periodicity—than compared to the case P1=Q1.

MLA L1 and/or LSA S1 may be one-dimensional (i.e. linear) arrays, but for many applications, MLA L1 and/or LSA S1 are two-dimensional arrays.

FIG. 5 is a schematic illustration of a top view of an MLA L1 and an LSA S1, which can be used for high-contrast pattern generation, wherein MLA L1 and also LSA S1 have, in both lateral directions (x and y; in contrast to z which is along the optical axes of the microlenses and typically also along the light emission direction of the light sources), the same pitch P1 and Q1, respectively. Furthermore, in FIG. 5 applies P1=2Q1.

FIG. 6 is a schematic illustration in a top view of an MLA L1 and an LSA S1, which can be used for high-contrast pattern generation, wherein both, MLA L1 and LSA S1, have different pitches in x- and y-directions, wherein in particular P1$x$=2P1$y$ and Q1$x$=2Q1$y$ applies.

And furthermore, in FIG. 6, P1$x$=Q1$x$ and P1$y$=Q1$y$ applies. However, as indicated above, this does not have to be the case. FIG. 7 is an illustration of an alternative LSA S1 to the LSA S1 in FIG. 6, in a top view, wherein P1$x$=Q1$x$ and 2P1$y$=Q1$y$ applies.

FIG. 6 further illustrates that not only rotationally symmetric microlenses 2, but also aspheric microlenses 2 may be provided in MLA L1. Aspheric microlenses may be (but do not have to be) arranged in a pattern with different pitches P1$x$, P1$y$ in different directions, as illustrated in FIG. 6, which can make possible to use most of the light emitted by LSA S1.

The shape of the microlenses determines the field of view of the apparatus, i.e. the angular range into which the structured light is emitted. For various applications, it may be desirable to illuminate a non-circular area, e.g., a rectangular area. In such cases, it can be advantageous to create an approximately rectangular field of view, because then, the light intensity produced by the light sources can be made use of more efficiently, since then, no (or only little) intensity is emitted into undesired directions (outside the desired field of view). Aspheric lenses are well suitable for creating tailored fields of view.

The high-contrast patterns described so far are usually very simple patterns having a small unit cell. However, for some applications, it can be advantageous to create more complex patterns and patterns having larger unit cells, respectively.

FIG. 8 is a schematic illustration in a side view of an apparatus for producing patterned illumination of increased complexity. In this case, the apparatus includes at least two optical arrangements for producing structured light, a first of the arrangements including a first MLA L1, a second of the arrangements including a second MLA L2. All arrangements may share, at least in part, one LSA, as illustrated in FIG. 8 in which at least a portion of the light sources 1 illuminates at least two MLAs. Alternatively, the embodiment of FIG. 8 can be considered to show one optical arrangement which includes two MLAs L1, L2 and an LSA S1.

MLA L1 and MLA L2 are shifted with respect to each other by a distance dy. Such a shift can translate into a superposition of mutually shifted illumination patterns produced by the structured light of the apparatus, each optical arrangement producing one pattern. FIG. 10 is a schematic illustration of a pattern 8 created by structured light produced by the apparatus according to FIGS. 8 and 9.

FIG. 9 is a schematic illustration of MLAs according to FIG. 8, in a top view. While in FIG. 8 only two MLAs (MLA L1, MLA L2) are visible, FIG. 9 shows that, e.g., four MLAs (L1, L2, L3, L4) can be included in the apparatus, and accordingly, the apparatus can be considered to include four optical arrangements. As suggested in FIG. 8, all four optical arrangements may share, at least in part, one LSA S1.

In the corners of FIG. 9, the shifts are symbolized by arrows, and the symbols used in FIG. 10 for illustrating which portion of the illustrated pattern 8 originates from which MLA are illustrated there, too. The shape and visual appearance of the symbols is not related to the shape or visual appearance of structures in the pattern 8. They merely indicate locations of high intensity in the illumination pattern.

In FIGS. 8-10, it is assumed that P1=P2=Q1. But this does not need to be the case.

The above-cited equation, however, is, of course, assumed to be valid for each optical arrangement.

As indicated above already, alternatively to interpreting embodiments with two or more MLAs and one or more shared LSAs (or, similarly, embodiments with two or more LSAs and one or more shared MLAs) as including two or more optical arrangements, as proposed above for the embodiment of FIGS. 8-10, it is also possible to view such embodiments as including an optical arrangement which includes said MLAs and said LSAs.

While FIG. 9 illustrate the case of m=4 MLAs which altogether occupy a rectangular area, it is also possible that the apparatus includes m MLAs (m being an integer of at least two, e.g., of at least three) which altogether occupy a differently shaped area.

FIG. 9A illustrates m=5 MLAs which altogether occupy a circular area.

FIG. 9B illustrates m=3 MLAs which altogether occupy a rectangular area.

Furthermore, in the embodiments of FIGS. 9, 9A, 9B, each of the m MLAs is adjoining two neighboring ones of the m MLAs at respective straight border lines, wherein the border lines of all m MLAs are adjoining at a common point, and wherein the respective border lines of each of the m MLAs are at an angle of 360°/m with respect to each other. This makes them having shapes similar to pie slices (of a pie which is not necessarily round).

FIG. 9C illustrates m=3 MLAs which altogether occupy a rectangular area. But in contrast to the embodiment of FIG. 9B, the angles between the border lines of the MLAs do not amount to 360°/m (i.e. to 360°/3=120°), but are 180° and 90°, respectively.

The microlenses (and light sources, respectively) are not drawn in FIGS. 9A, 9B, 9C.

Of course, various other arrangements of m MLAs are possible.

However, in some embodiments, e.g., the above-described pie-slices-like arrangement can provide a particularly uniform participation of the different MLAs in production of the structured light.

Different ones of the MLAs can be shifted with respect to each other, e.g., like illustrated in FIGS. 8, 9. However, the can also be rotated with respect to each other, as will be explained below, e.g., at FIGS. 11, 12.

Alternatively or additionally, some of the MLAs can differ in their lens pitch.

In some embodiments, all m MLAs are included in one and the same single-piece optical component. E.g., all m MLAs can be simultaneously manufactured by the very same process steps.

FIG. 11 shows a schematic illustration in a top view of MLAs L1, L2 for producing structured light of increased complexity. In this case, principal axes of the MLAs L1 and L2 are rotated with respect to each other by an angle φ (in the lateral plane, the x-y plane). Angle φ is typically smaller than 12°, e.g., smaller than 6°. Angle φ can, e.g., amount to between 0.1° and 4°. However, virtually any angle φ may be used.

Two MLAs can, e.g., be used together with the two mutually rotated LSAs. And each of the LSAs can, e.g., be aligned parallel to its associated MLA. But alternatively, a single LSA can be used for illuminating both MLAs L1, L2.

FIG. 12 is a schematic illustration of a pattern 8 created using the MLAs L1, L2 of FIG. 11.

Of course, further MLAs and LSAs and thus, further optical arrangements, may be included in the apparatus.

On the sides of FIG. 11, the symbols used in FIG. 12 for illustrating, in the same way as FIG. 10, which portion of the illustrated pattern 8 originates from which MLA are illustrated.

In FIGS. 11, 12, it is assumed that P1=P2=Q1. But this does not need to be the case.

The above-cited equation, however, is, of course, assumed to be valid for each optical arrangement.

Still another way of creating more complex light patterns is illustrated in FIGS. 13-16. In this case, complex unit cells are created by selecting at least two, e.g., four, MLAs which have different lens pitches.

Figure 13:
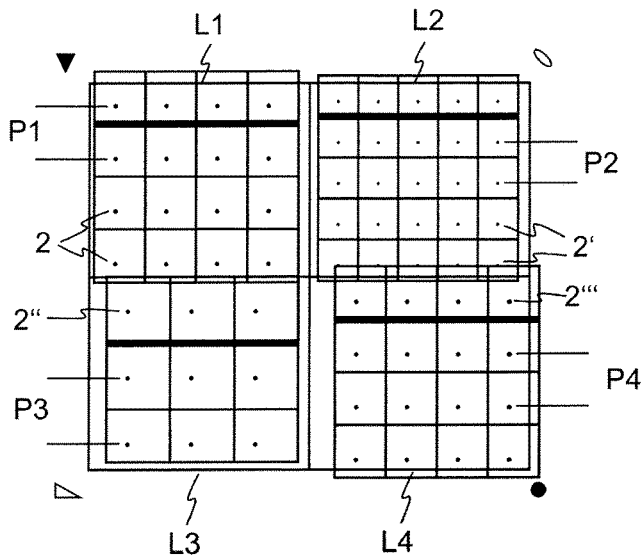

FIG. 13 is a schematic illustration in a top view of MLAs L1, L2, L3, L4 for producing structured light of increased complexity by providing four different lens pitches P1, P2, P3, P4. The microlenses are referenced 2, 2', 2", 2'" for the different MLAs.

Figure 14:
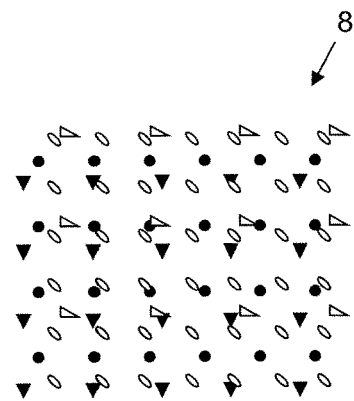

In the same way as in FIG. 10 with relation to FIG. 8, FIG. 14 symbolically illustrates a pattern 8 obtainable using MLAs as illustrated in FIG. 13.

While in conjunction with FIGS. 9, 9A, 9B, 9C and 13 arrangements of MLAs have been discussed, it is also possible to arrange M LSAs (with an integer M≥2 or M≥3)

in the same type of arrangements. In these Figures, merely L1, L2 . . . would have to be replaced by S1, S2 . . . , and P1, P2 . . . by Q1, Q2 . . . ).

Similarly to what has been described above for MLAs, also the LSAs can have identical (lens source) pitches, which would be Q1, Q2, Q3, Q4. And different ones of the LSAs can be shifted with respect to each other, e.g., like illustrated in FIG. 9 for MLAs. And they can also be rotated with respect to each other, as has been explained above for MLAs (cf. FIGS. 11, 12), e.g., by small angles such as between 0.1° and 4°. Two or more of the LSAs, e.g., all of them, can be (but need not be) congeneric LSAs.

Alternatively or additionally, some of the LSAs can differ in the wavelength of the light emitted by the respective light sources.

In some embodiments, all M LSAs are included in one and the same single-piece component. E.g., all M LSAs can be simultaneously manufactured by the very same process steps and/or all LSAs are provided in one and the same single-piece substrate.

Figure 15:
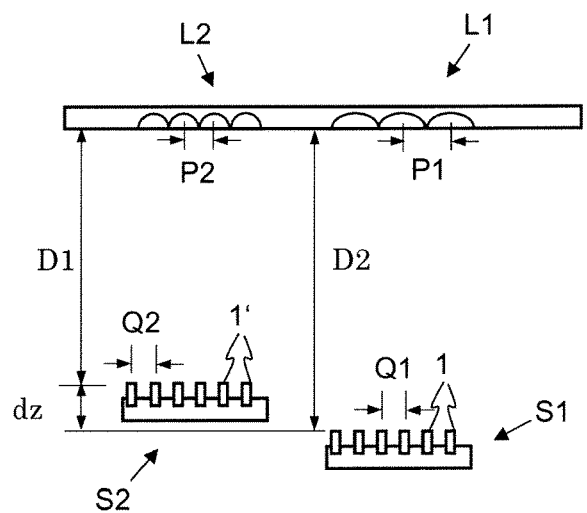
Figure 16:
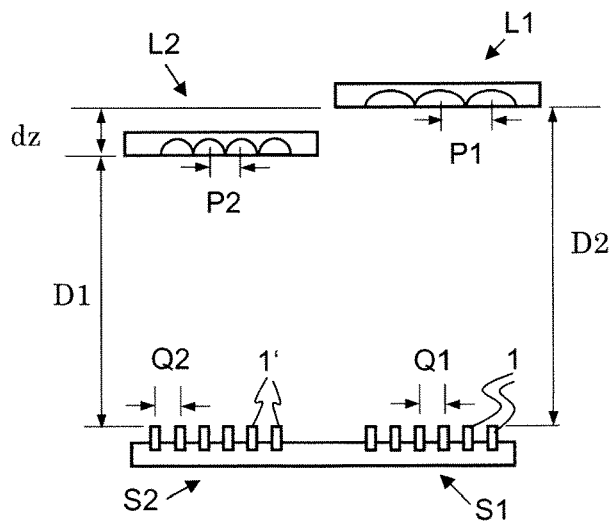

FIGS. 15 and 16 show schematic illustrations in a side view of apparatuses for producing structured light of increased complexity using MLAs such as those of FIG. 13.

In order to fulfill the above-cited equation for all four optical arrangements (and assuming the same integers N1=N2=N3=N4 and the same wavelengths L1=L2=L3=L4), distances D1, D2 (and D3 and D4) have to be different. This is exemplarily illustrated by a difference distance dz.

In FIG. 15, the MLAs share a common lens plane. Accordingly, the LSAs may have different emission planes to satisfy the above-cited equation. The distances D1, D2, D3, D4 are the distances between the common lens plane and the emission plane of respective LSA.

In FIG. 16, the LSAs share a common emission plane. Accordingly, the MLAs may have different lens planes to satisfy the above-cited equation. The distances D1, D2, D3, D4 are the distances between the common emission plane and the lens plane of the respective MLA.

It is possible to realize an apparatus described in FIGS. 13 and 14 in such a way that all emission planes coincide with a common emission plane and that all lens planes coincide with a common lens plane. This can be accomplished by suitably selecting the integers N1, N2, N3, N4 and/or the wavelengths L1, L2, L3, L4 emitted by the light emitters 1, 1' . . . of the respective LSAs S1, S2, . . . .

Still another way of creating complex illumination patterns is illustrated in FIGS. 17, 18. In this case, an additional optical component, e.g., an array of passive optical components, is inserted in the light path (between the MLA and the scene).

Structured light of increased complexity can be produced by providing a diffractive optical element (DOE) in the light path after the MLA (or MLAs). E.g., the DOE can create from each incoming light ray exiting the microlens array at least two outgoing light rays.

FIG. 17 is a schematic illustration of a side view of an apparatus for producing structured light of increased complexity using a prism array 3. The prism array includes a multitude of prisms 4. By the prisms 4, light from the MLA L1 is redirected, so as to create a superposition of patterns.

FIG. 18 is a schematic illustration of a pattern created using the apparatus of FIG. 17.

The additional optical component, e.g., DOE and the prism array 3, respectively, may be realized in a single-piece optical component together with the MLA (or, possibly with the MLAs in case two or more would be provided).

In the embodiments illustrated above, two or more LSAs (if present) are arranged side by side, such that they occupy separate areas. As has been explained, some of the LSAs can be shifted with respect to each other or rotated with respect to each other. And/or they can differ in their respective light source pitches. And/or they can differ in the wavelength of their respective emitted light.

FIG. 19A illustrates in a top view a detail of two LSAs which are arranged side-by-side and which are mutually shifted. Light sources of the first LSA S1 are symbolized by open ellipses, light sources of the second LSA S2 are symbolized by filled ellipses. LSAs S1 and S2 are, but need not be, congeneric LSAs with light sources regularly present on a rectangular grid having the same pitch along the first principal axis and the same pitch along the second principal axis. LSAs S1 and S2 are mutually shifted with respect to each other within the emission plane. The shift is symbolized by the open arrow in FIG. 19A and has components dx and dy, respectively, along the two principal axes.

The side-by-side arrangement of the LSAs can, in instances, lead to a non-uniform illumination of the MLA(s) which can in instances be undesired. The non-uniformity in the illumination can produce variations in light intensity of features, such as high-intensity light points, of the produced structured light.

It is, however, possible to provide an LSA which can provide an improved uniformity of the illumination of the MLA(s) and/or which occupies a smaller area than in case of a side-by-side arrangement. And nevertheless, such an LSA can fulfill functions fulfilled by LSAs in a side-by-side arrangement.

A detail of such an LSA is illustrated in FIG. 19B in a top view. The LSA S* of FIG. 19B can be imagined to be derivable by overlaying LSAs S1 and S2 of FIG. 19A. The light sources of LSA S* symbolized by open ellipses form a first group, and the light sources symbolized by filled ellipses of LSA S* form a second group, and these light sources are interdispersed. Thus, the respective arrays of light sources of the different groups occupy (substantially) one and the same area.

In instances, en embodiment such as the one of FIG. 19B cannot be realized because of manufacturing constraints requiring more space between neighboring light sources.

For example in such cases MLAs composed of overlaid MLAs, it is possible to leave out light sources at some positions, as is illustrated in FIG. 19C. While in FIG. 19B, each lattice point of a first lattice is occupied by a light source of the first group and each lattice point of a second lattice is occupied by a light source of the second group, in FIG. 19C, some lattice points of the first lattice and some points of the second lattice are not occupied by a light source. Those empty positions are marked by small diamonds. Various schemes of selecting lattice points to be occupied and lattice points to remain unoccupied can be applied.

FIGS. 20A-B and 21A-D illustrate some examples.

Figure 20A:
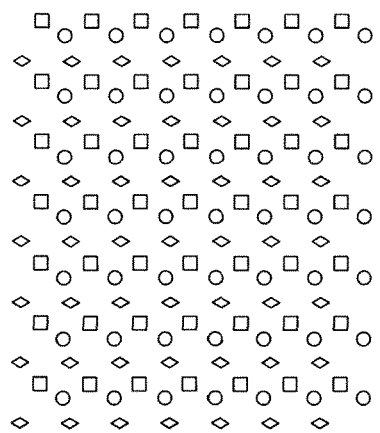

FIG. 20A illustrates the result of simply overlaying three mutually shifted LSAs. Light sources of one and the same LSA are symbolized by like symbols, i.e. by diamonds for the first LSA, by circles for the second LSA or by squares for the third LSA.

Figure 20B:
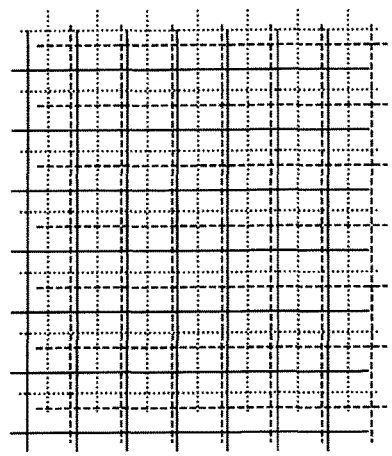

FIG. 20B illustrates the underlying lattices. The first lattice (cf. diamonds) is illustrated by solid lines, the second lattice (cf. circles) by dashed lines, the third lattice (cf. squares) by dotted lines.

Depending on, e.g., manufacturing constraints or other factors, one can leave out light sources at certain ones of the lattice points, thus resulting in an arrangement of light sources, e.g., of one of FIG. 21A-D or in still another arrangement.

Despite having unoccupied lattice points, the character of the produced structured light (in the sense of the position of features such as position of intensity maximum points) is the same in case of any of FIGS. 20A, 21A, 21B, 21C, 21D. Some variation in relative intensity of produced features in the structured light pattern can occur, however, depending on the selection of unoccupied lattice points.

Figure 21A:
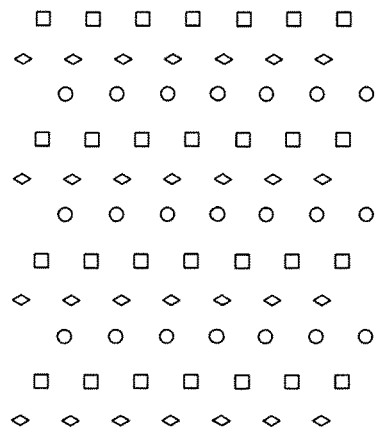
Figure 21B:
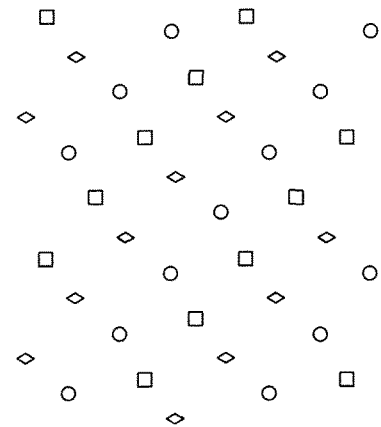
Figure 21C:
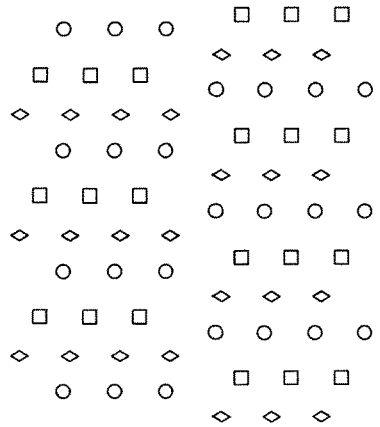
Figure 21D:
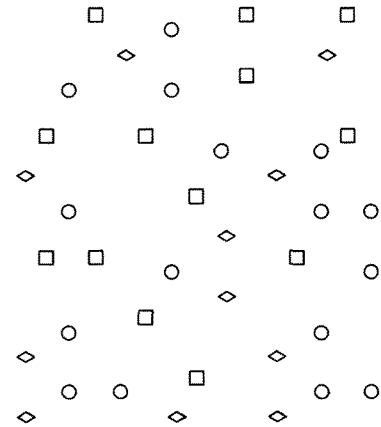

It is not necessary, but can be provided, that the light sources are periodically arranged, cf., e.g., FIG. 21D which is meant to illustrate a random distribution of the light sources on lattice points of their respective lattice. For sharpness of produced structured light features, it can be of advantage to have light sources located on lattice points of the associated lattice only (and not elsewhere).

Of course, it is possible to handle cases with mutually rotated LSAs in the same way as just described for the case of shifted LSAs.

Furthermore, the lattices may have other geometries, e.g., in case of hexagonal lattices instead of rectangular lattices.

With reference to FIGS. 22A, 22B, 23A, 23B, 24A, 24B, we describe another way of creating an increased complexity in the produced structured light using two or more MLAs while trying to avoid or at least to minimize intensity differences between light exiting different ones of the MLAs L1, L2 and thus between different sets of produced features.

In some implementations, a more complex pattern such as a more complex arrangement of features may be produced when using two MLAs which are, e.g., mutually shifted or rotated—which can also be viewed as an MLA being composed of two or more sub regions, and the positions of the microlenses are shifted or rotated in the one sub-region versus the other sub region). Each MLA can be shifted or rotated with respect to an adjacent MLA and, optionally, with respect to the light source positions in the LSA (which can be, e.g., a VCSEL array). In some implementations, the light source pitch and the MLA lens pitch are the same. Also the lens pitches of both MLAs can be the same.

FIGS. 22A, 22B illustrate in a top view and in a side view, respectively, an optical arrangement in which two mutually shifted MLAs are illuminated by one and the same LSA S1.

For example, as illustrated in FIGS. 22A and 22B, MLA L1 and MLA L2 can have the same lens pitch, which again can be identical with the light source pitch of LSA S1, while MLA L2 is shifted with respect to MLA L1 (shift dx) and with respect to the LSA S1. A more complex arrangement of features can hereby result (e.g., showing twice the number of features of what is produced if only one of the MLAs were used). The hashed circle illustrates the area of illumination of the LSA S1 on the MLAs.

As is clear from FIG. 22A, 22B, a non uniform area of illumination may result because of the shift dx.

For example, a portion of MLA L1 illuminated by LSA S1 can be larger than the illuminated portion of MLA L2. Consequently, the features produced by MLA L2 may have less intensity than the features produced by MLA L1.

In other words, the area of illumination is not uniformly distributed over the two MLAs due to the shift between the MLAs, and accordingly, the intensity of features (e.g., dots) produced by MLA L1 will be greater than the intensity of the features produced by MLA L2.

FIGS. 23A, 23B illustrate in the same way as FIGS. 22A, 22B the MLAs and the LSA of FIGS. 22A, 22B, wherein a misalignment DX of the LSA S1 with respect to the MLAs L1, L2 is illustrated.

The problem of non-uniform illumination of the MLAs noted under FIG. 22A, 22B is in this case exacerbated by an additional shift (misalignment) DX of the VCSEL array.

An even stronger non uniformity of illumination may result.

In some implementations, such variations in intensity can be desirable (for example, the intensity variation itself may contribute to pattern and to the feature complexity, respectively). However, in other implementations, such a variation in intensity is not desirable.

Figure 24A:
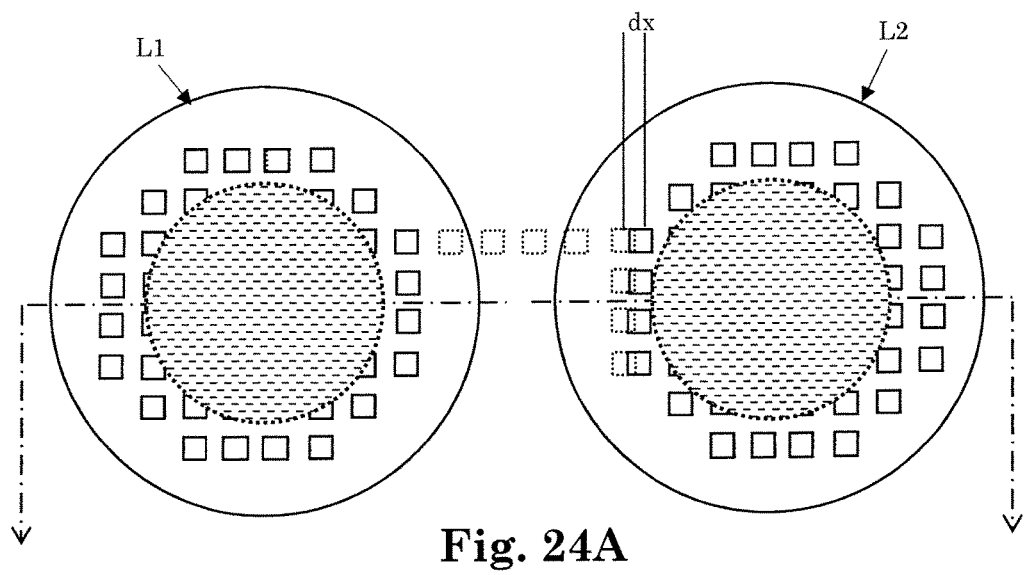
Figure 24B:
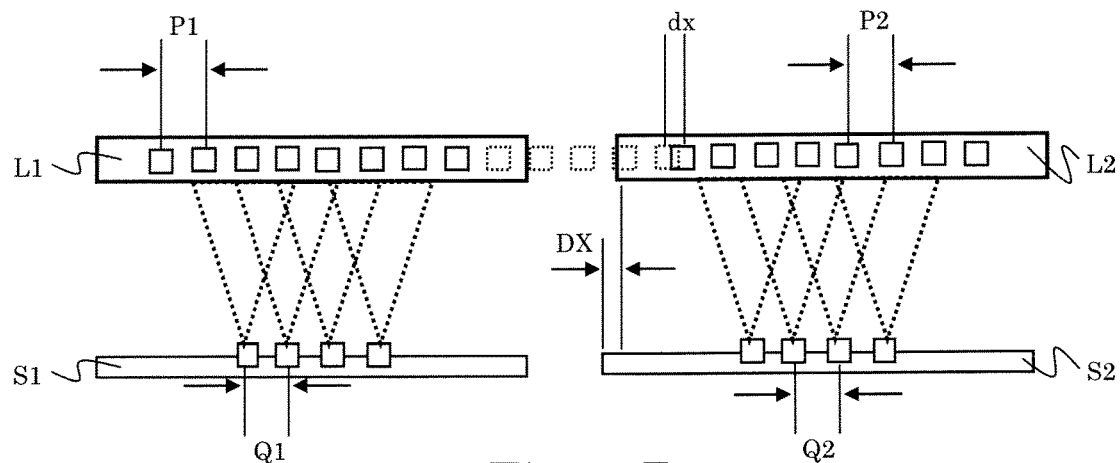

In FIGS. 24A, 24B, an implementation is illustrated that
1) produces greater complexity (corresponding to the complexity from MLAs L1, L2 depicted in FIGS. 22A, 22B and in FIGS. 23A, 23B, respectively) and
2) overcomes or at least strongly reduces variations in feature intensity.

The implementation depicted in FIGS. 24A, 24B employs multiple LSAs (such as multiple VCSEL arrays) and multiple MLAs. E.g., each MLA is illuminated by one associated LSA.

In addition, the power or light intensity of the features may be increased due to the use of multiple LSAs (when compared to illumination with a single LSA only).

FIGS. 24A, 24B illustrate an optical arrangement in which two mutually shifted MLAs L1, L2 are illuminated by one of two LSAs S1, S2 each, in a top view and in a side view, respectively.

The implementation illustrated in FIGS. 24A, 24B includes or is composed of multiple MLAs L1, L2, each with a corresponding LSA S1 and LSA S2, respectively In this implementation, the MLA lens pitches P1 and P2, and the LSA light source pitches Q1 and Q2 are all the same; that is they are the same within each channel (an LSA and its associated MLA forming a channel) and with respect to the other channel. For example, the lens pitch P1 (of MLA L1) is the same as the light source pitch Q1 (of LSA L1), and is the same as lens pitch P2 and is the same as light source pitch Q2. However, in other implementations, this need not be the case.

In the implementation illustrated in FIGS. 24A, 24B, MLA L2 is shifted by a shift of dx with respect to MLA L1 (note: in this implementation the lens pitches P1, P2 and the light source pitches Q1, Q2 are the same). Furthermore, in FIGS. 24A, 24B, the option is illustrated that also MLA L2 is shifted with respect to LSA S2, i.e. in this case, the left channel and the right channel are not congeneric channels, but differ in their respective relative alignment of the respective LSA to the associated MLA. This can be viewed as providing two mutually shifted LSAs S1, S2.

In an alternative option (not illustrated in FIGS. 24A, 24B), the channels are congeneric channels. I.e. the relative position of MLA L1 to LSA S1 and the relative position of MLA L2 to LSA S2 is the same. The corresponding illustration would show, e.g., twice the left channel of FIGS. 24A, 24B, of course, with MLA L1 and MLA L2 being mutually shifted as described.

The dotted squares in FIGS. 24A, 24B are drawn merely for illustrating the shift between the MLAs.

As MLA L1 and MLA L2 each are positioned with respect to a corresponding (associated) LSA, no (or only negligible) differences in produced feature intensity is expected to exist between the features produced in each channel, i.e. between features originating from MLA L1 and features originating from MLA L2. Of course, imbalance can originate if LSA S1 and LSA S2 emit light having different intensities.

While embodiments illustrated above involve one or more arrays of light sources and thus a plurality of light sources for illuminating the MLAs, it is also possible to use a single light source for illuminating the MLA (or the MLAs).

Figure 25:
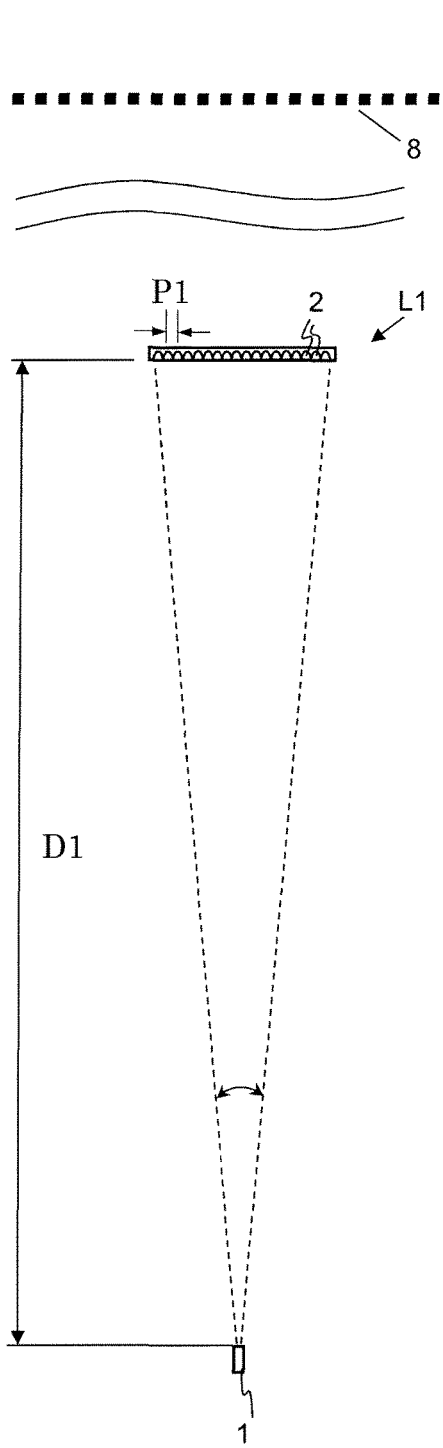

FIG. 25 is an illustration of an apparatus for producing structured light in which a only a single light source 1 illuminates an MLA L1. In instances, this can result in less contrast in the produced structured light than in the case that a periodic array of light sources would illuminate the MLA, e.g., with the lens pitch P1 being equal to the light source pitch.

Figure 28:
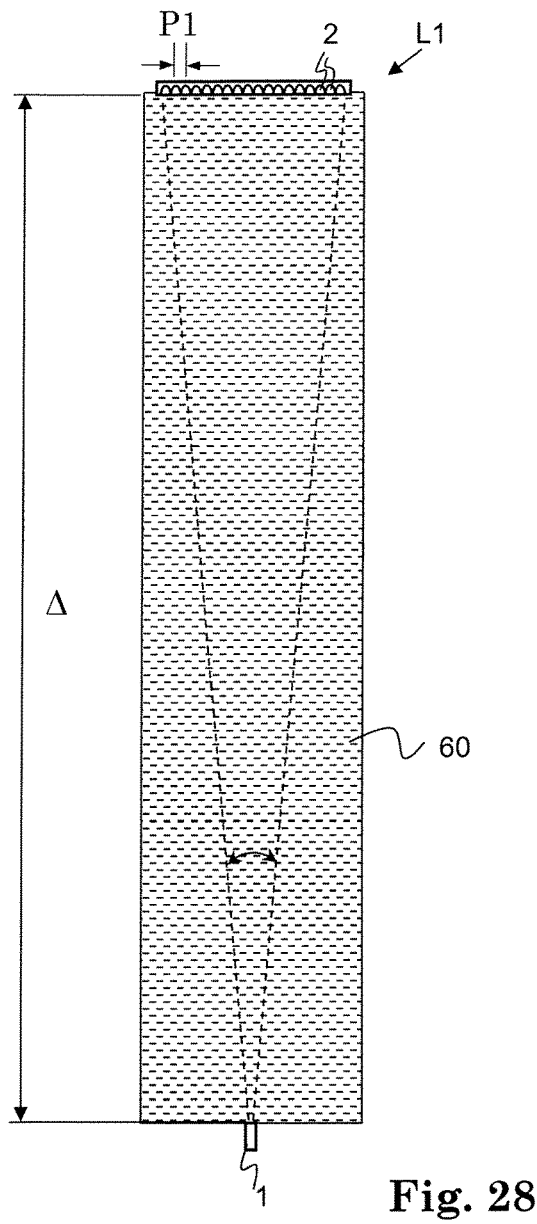
Figure 29:
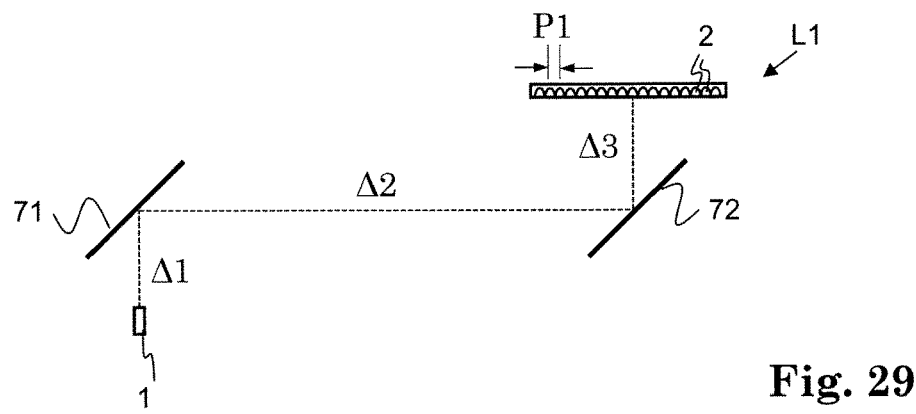

FIGS. 28 and 29 illustrate cases in which the distance D to be used in the discussed equations does not correspond to a geometrical distance between an aperture and an MLA as is the case in the examples illustrated so far, in which it is assumed that the light from each light source propagates along a direct straight path from the aperture through a medium having a refractive index of 1.0 to the MLA. But in FIGS. 28, 29, the distance D is an optical path length differing therefrom.

Furthermore, FIGS. 28 and 29 illustrate ways for minimizing a vertical extension of the apparatus. In other words, by techniques like illustrated in FIGS. 28, 29, an apparatus can be shallower than without said techniques and nevertheless produce (at least substantially) the same structured light.

For simplifying the illustrations, in FIGS. 28 and 29, the case of a single light sources is drawn, but it is readily understood that an illumination unit comprising an array of light sources can be used, too. In FIG. 29, for reasons of simplicity, no cone of emitted light is drawn. However, a cone is present, and a multitude of microlenses of the MLA is illuminated by the light source.

Furthermore, the techniques explained using FIGS. 28, 29 can of course be combined with the other embodiments, e.g., with providing more than one MLA, mutually shiftign and/or rotating MLAs and/or LSA.

FIG. 28 illustrates in a side view an apparatus for producing structured light in which an MLA L1 is illuminated through a block of material 60 having a refractive index n which differs from 1. The geometrical distance 4 between the aperture of the light source 1 and the MLA L1 is indicated in FIG. 28. The optical path length D to be used in the discussed equations is n times $\Delta$ (i.e. D=n$\Delta$), with n designating the refractive index of the material of block 60. Accordingly, with appropriately chosen materials (and refractive indices), shallower apparatuses can be designed.

Of course, the block 60 of material not necessarily has to extend over the whole geometrical distance between MLA L1 and light source 1, but can be present along merely a portion thereof.

FIG. 29 is an illustration of an apparatus for producing structured light in which an MLA is illuminated by light propagating along a folded path, in a side view. The apparatus includes two reflective elements 71, 72 in the light path from the light source 1 to the MLA L1, such as micromirrors. In this case, the light propagates from light source 1 to MLA L1 along three partial paths 41, 42, 43, such that the optical path length D to be used in the above equations amounts to D=$\Delta 1+\Delta 2+\Delta 3$. For producing a folded light path, it is possible to use less reflective elements (i.e. no more than one reflective element) or more than two. Again, a longer optical path (i.e. a larger optical path length) can be achieved while being able to keep the thickness (vertical extension) of the apparatus constant.

Of course, embodiments with blocks of material 60 (with refractive index differing from 1, cf., e.g., FIG. 28) and embodiments with folded light paths (such as, e.g., in FIG. 29) can be combined with each other.

Figure 26:
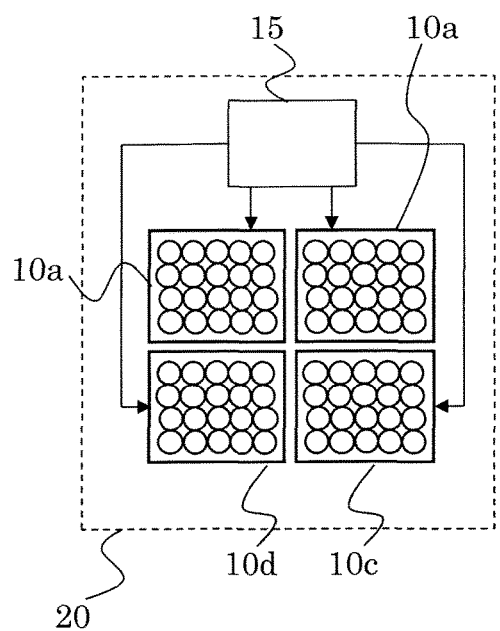

FIG. 26 illustrates a device 20 which includes several apparatuses 10a, 10b, 10c, 10d. Each of the apparatuses can be an apparatus as described herein before. The apparatuses can be congeneric apparatuses. In other embodiments, at least some of the apparatuses have different properties, e.g., they emit light of different wavelengths or are structured and configured to produce differently structured light.

The device 20 can include a controller 15 which can selectively switch on and off single ones and/or groups of the apparatuses. This way, e.g., the intensity of the structured light emitted from the device 20 can be varied and/or the pattern of the emitted light can be varied.

In the device, the apparatuses can be placed next to each other, with their respective emission planes coinciding.

The apparatuses can be regularly arranged on a grid, e.g., on a rectangular grid.

A relatively high light intensity can be producible by the device when several of the apparatuses are included, while the arrangement of apparatuses can nevertheless be very shallow.

Each apparatus can be considered to represent module or a channel, such that the device is a multi-channel device having one module per channel. Each channel can be operable independently from the other channels.

Providing multi-channel devices can strongly reduce customizing efforts for the apparatuses. E.g., depending on the application and the device, respectively, it can be decided about a number of congeneric modules (and thus of channels) to implement in the device. And it can be decided about their relative positions—in terms of, e.g., possible shifts and/or rotations—so as to have the possibility produce complex patterns.

Instead of designing a new apparatus for each new type of device, it can be sufficient to provide a merely a small range of different apparatuses, which several of which can be suitable composed for each new type of device.

It can be possible to change the field of illumination of the device by switching on and off one or more of the implemented modules.

If congeneric modules are implemented in the device which are positioned to effectively have no mutual rotation and no mutual shifts, switching on and off one or more of the modules can be used to control the intensity of the emitted structured light.

In some applications, apparatuses herein described can be used in devices including a detector for detecting light reflected from a scene illuminated by structured light emitted from the apparatus or apparatuses. This can be done, e.g., for distance ranging.

The detector, e.g., an image sensor, can include an array of light sensitive elements such as image pixels regularly arranged on a grid describing two axes. The axes can be, e.g., perpendicular to each other such as in case of a rectangular grid.

Signals detected by the light sensitive elements can be read out of the detector in a rastered fashion such as line-by-line, wherein the lines are parallel to one of the axes.

Figure 27A:
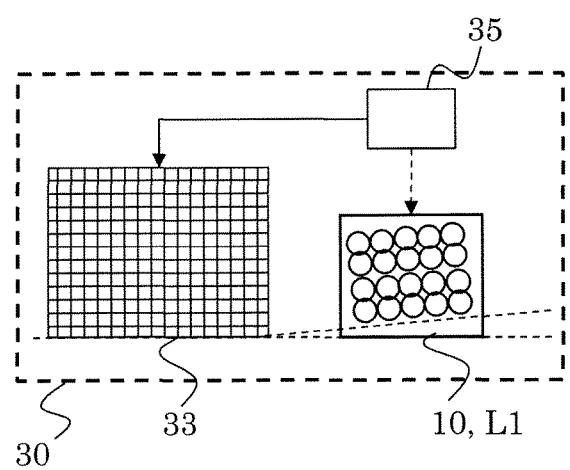

FIG. 27A illustrates a device 30 including an apparatus 10 and a detector 33. The apparatus can be any apparatus herein described and includes an MLA L1. The detector can be an image sensor. Device 30 can include a controller 35 for reading out and evaluating data from detector 33.

Figure 27B:
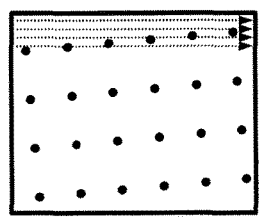

FIG. 27B illustrates a data set taken by detector 33 of device 30 of FIG. 27A. The filled circles represent intensity maxima. The dotted arrows symbolize the first four lines along which detector 33 is read out during a read-out cycle.

Detector 33 and MLA L1 are mutually positioned such that a symmetry axis of MLA L1 is at an angle with both axes of detector 33. Dashed lines in FIG. 27A indicate this.

If the lines along which detector 33 is read out were parallel to the symmetry axes of MLA L1, the intensity maxima would be aligned parallel to these lines. This could make an evaluation of the data difficult, as there would be lines with many high-intensity events while other lines would detect very low intensity only.

However, with the described angled alignment of detector 33 and MLA L1, the intensity distributions along the read-out lines is much more similar for many different lines, cf. FIG. 27B. This can simplify evaluation of the detected data.

Returning to the described apparatuses, it is noted that in those apparatuses which include two or more MLAs (cf., e.g., FIGS. 9, 11), all the MLAs may be realized in a single-piece optical component.

A single-piece optical component may be produced, e.g., by a replication technique such as by injection molding or embossing, or by replicating the MLAs and/or further optical components on one side or on two sides of a substrate plate such as on a glass plate.

Also, in those apparatuses which include two or more LSAs (cf., e.g., FIGS. 13, 16), all the LSAs may be realized in a single-piece component.

The described rotations of MLAs with respect to each other or of LSAs with respect to each other or of an MLA with respect to an associated LSA can in any of the cases be rotations about an axis perpendicular to the emission plane.

The described shifts of MLAs with respect to each other or of LSAs with respect to each other can be in any of the described cases a shift of, e.g., in the range of $(n1+0.2\pm0.1)$ times the corresponding pitch along a first symmetry axis such as along the x-axis, and by a distance of in the range of $(n2+0.35\pm0.1)$ times the corresponding pitch along a second symmetry axis such as along the y-axis, wherein $n1\geq0$ and $n2\geq0$ are integers.

Despite various of the Figures suggesting that lens apertures of the illustrated lenses are circular, it is well possible to use MLAs with microlenses having other lens apertures, e.g., polygonal ones.

Of course, the various ways of making the structured light and the producible patterns more complex may be combined with each other.

Other implementations are within the scope of the claims.

What is claimed is:

1. An apparatus for producing structured light, the apparatus comprising a first optical arrangement comprising:
a microlens array comprising a multitude of transmissive or reflective microlenses which are regularly arranged at a lens pitch P; and
an illumination unit for illuminating the microlens array; the illumination unit comprising an array of light sources for emitting light of a wavelength L each and having an aperture each, wherein the apertures are located in a common emission plane which is located at a distance D from the microlens array, wherein $$P^2 = 2LD/N,$$

and wherein N is an integer with $N\geq1$.

2. The apparatus according to claim 1, wherein the microlenses are aspherical microlenses.

3. The apparatus according to claim 1, wherein each of the light sources is operable to emit the light of the wavelength L into an emission cone having a circular or non-circular cross-section, wherein the emission cones of immediately adjacent light sources are partially overlapping.

4. The apparatus according to claim 1, wherein the light sources of the array are regularly arranged at a light source pitch Q, wherein for P and Q applies pP=qQ, wherein p and q are integers having no common factor, with p≥1 and q≥1.

5. The apparatus according to claim 1, wherein the microlens array is a first microlens array, and the first optical arrangement comprises, in addition to the first microlens array, a second microlens array, wherein the first and the second microlens arrays are congeneric microlens arrays which are shifted with respect to each other in a direction parallel to the emission plane.

6. The apparatus according to claim 5, wherein the second microlens array comprises a multitude of transmissive or reflective microlenses which are regularly arranged at a lens pitch PP which is different from the lens pitch P.

7. The apparatus according to claim 1, wherein the array of light sources is a first array of light sources, and the illumination unit comprises, in addition to the first array of light sources, a second array of light sources, wherein the first and the second arrays of light sources are congeneric arrays of light sources which are shifted with respect to each other in a direction parallel to the emission plane.

8. The apparatus according to claim 1, wherein the first optical arrangement comprises, in addition to the microlens array, further (m−1) microlens arrays, wherein m is an integer with m≥3, and wherein each of the m microlens arrays is adjoining two neighboring ones of the m microlens arrays at respective border lines, and wherein the border lines of all m microlens arrays are adjoining at a common point.

9. The apparatus according to claim 1, wherein the illumination unit comprises, in addition to the array of light sources, further (M−1) arrays of light sources, wherein M is an integer with M ≥3, and wherein each of the M arrays of light sources is adjoining two neighboring ones of the M arrays of light sources at respective border lines, and the border lines of all M arrays of light sources are adjoining at a common point.

10. The apparatus according to claim 1, wherein the optical arrangement comprises an additional optical component, wherein the microlens array is arranged between the illumination unit and the additional optical component.

11. The apparatus according to claim 10, wherein the additional optical component comprises a diffractive optical component.

12. The apparatus according to claim 10, wherein the diffractive optical component is structured and arranged to create from each incoming light ray exiting the microlens array at least two outgoing light rays.

13. The apparatus according to claim 10, wherein the additional optical component comprises at least one prism.

14. An apparatus for producing structured light, the apparatus comprising a first optical arrangement comprising:
a microlens array comprising a multitude of transmissive or reflective microlenses which are regularly arranged at a lens pitch P; and
an illumination unit for illuminating the microlens array; the illumination unit comprising an array of light sources for emitting light of a wavelength L each and having an aperture each, wherein the apertures are located in a common emission plane which is located at a distance D from the microlens array, wherein $$P^2 = 2LD/N,$$

and wherein N is an integer with N≥1;
the apparatus further comprising a second optical arrangement comprising:
a second microlens array comprising a multitude of transmissive or reflective second microlenses which are regularly arranged at a lens pitch P2; and
a second illumination unit for illuminating the second microlens array;
the second illumination unit comprising a second array of light sources for emitting light of a wavelength L2 each and having an aperture referred to as second aperture each, wherein the second apertures are located in a common plane referred to as second emission plane which is located at a distance D2 from the second microlens array, wherein $$(P2)^2 = 2*L2*D2/N2,$$

and wherein N2 is an integer with N2≥1, and wherein the second microlens array and the microlens array of the first optical arrangement are separate microlens arrays, and the second array of light sources and the array of light sources of the first optical arrangement are separate arrays of light sources.

15. The apparatus according to claim 14, wherein the light sources of the first optical arrangement are structured and arranged not to illuminate the second microlens array, and the light sources of the second array of light sources are structured and arranged not to illuminate the microlens array of the first optical arrangement.

16. The apparatus according to claim 14 wherein P2=P, and wherein the second microlens array is shifted with respect to the microlens array of the first optical arrangement in a direction parallel to the emission plane, wherein a component of the shift along an axis along which the microlenses of the first and of the second microlens array have pitch P is different from an integer multiple of pitch P.

17. An apparatus for producing structured light, the apparatus comprising a first optical arrangement comprising:
a microlens array comprising a multitude of transmissive or reflective microlenses which are regularly arranged at a lens pitch P; and
an illumination unit for illuminating the microlens array; the illumination unit comprising an array of light sources for emitting light of a wavelength L each and having an aperture each, wherein the apertures are located in a common emission plane which is located at a distance D from the microlens array, wherein $$P^2 = 2LD/N,$$

and wherein N is an integer with N≥1; and
wherein the light sources of the array are regularly arranged at a light source pitch Q, and wherein the array of light sources is referred to as first array of light sources, and wherein the illumination unit comprises, in addition to the first array of light sources, a second array of light sources which is congeneric with the first array of light sources; and
wherein the second array of light sources is rotated with respect to the first array of light sources, and wherein light sources of the second array of light sources are structured and arranged to illuminate the microlens array.

18. The apparatus according to claim 17, wherein the first array of light sources and the second array of light sources are both of rectangular geometry having two mutually perpendicular symmetry axes each, and wherein an angle φ between the symmetry axes of the first array of light sources and the symmetry axes of the second array of light sources amounts to more than 0° and to at most 5°.

* * * * *